US006614722B2

(12) United States Patent
Polany et al.

(10) Patent No.: US 6,614,722 B2
(45) Date of Patent: Sep. 2, 2003

(54) SYSTEM FOR HOUSING AN AUDIO SYSTEM IN AN AQUATIC ENVIRONMENT

(75) Inventors: Rany Polany, Escondido, CA (US); Ryan Austin Perry, San Diego, CA (US); Carl Wilhelm Pettersen, San Diego, CA (US); Kari Kristian Rauhala, San Diego, CA (US)

(73) Assignee: Diver Entertainment Systems, Inc., Escondido, CA (US)

( * ) Notice: Subject to any disclaimer, the term of this patent is extended or adjusted under 35 U.S.C. 154(b) by 0 days.

(21) Appl. No.: 09/930,037

(22) Filed: Aug. 14, 2001

(65) Prior Publication Data

US 2002/0122353 A1 Sep. 5, 2002

Related U.S. Application Data

(63) Continuation of application No. 09/411,983, filed on Oct. 4, 1999, now Pat. No. 6,396,769.

(51) Int. Cl.[7] .......................... H04B 11/00; B65D 81/00
(52) U.S. Cl. ....................................................... 367/131
(58) Field of Search ................................ 367/131, 132, 367/141, 165, 173, 188; 381/379, 189

(56) References Cited

U.S. PATENT DOCUMENTS

| | | | | |
|---|---|---|---|---|
| 4,281,343 A | | 7/1981 | Monteiro | |
| 4,336,537 A | | 6/1982 | Strickland | |
| 4,381,144 A | | 4/1983 | Breslau | |
| 4,456,797 A | | 6/1984 | Olsen | |
| 4,465,189 A | | 8/1984 | Molzan | |
| D278,761 S | | 5/1985 | Fuller | |
| 4,562,590 A | | 12/1985 | Delage | |
| 4,584,718 A | * | 4/1986 | Fuller | 455/351 |
| 4,646,872 A | * | 3/1987 | Kamon et al. | 181/129 |
| 4,682,363 A | | 7/1987 | Goldfarb | |
| 4,683,587 A | | 7/1987 | Silverman | |
| 4,727,599 A | | 2/1988 | Rappaport et al. | |
| 4,771,299 A | | 9/1988 | Gell, Jr. | |
| 4,949,806 A | | 8/1990 | Hofer | |
| 5,087,934 A | | 2/1992 | Johnson | |
| 5,136,555 A | | 8/1992 | Gardos | |
| 5,239,323 A | | 8/1993 | Johnson | |
| 5,258,592 A | | 11/1993 | Nishikawa et al. | |
| 5,285,894 A | | 2/1994 | Kamata et al. | |
| 5,294,988 A | | 3/1994 | Wakabayashi et al. | |
| 5,325,139 A | | 6/1994 | Matsumoto | |
| 5,337,364 A | | 8/1994 | Fitch | |
| 5,386,084 A | | 1/1995 | Risko | |
| 5,456,377 A | | 10/1995 | Williams | |
| 5,533,637 A | | 7/1996 | Williams, Jr. | |

(List continued on next page.)

FOREIGN PATENT DOCUMENTS

| | | | | |
|---|---|---|---|---|
| GB | 2290696 A | * | 1/1996 | A42B/1/00 |
| JP | 359144297 A | * | 8/1984 | H04R/1/10 |
| JP | 07298383 A | * | 11/1995 | H04R/1/10 |

*Primary Examiner*—Daniel T. Pihulic
(74) *Attorney, Agent, or Firm*—Knobbe, Martens, Olson & Bear, LLP

(57) ABSTRACT

A submersible, hydrostatic pressure tolerant enclosure for a portable audio device is disclosed. Also disclosed is a removable lid allowing for the inserting and removing of the device from the enclosure. The disclosure further provides a connector system and an audio communication link connecting the housing to a device capable of generating sound, and to a device capable of producing sound while being submerged in an aquatic environment. Also disclosed are headsets containing at least one speaker within a waterproof enclosure. The speakers may be positioned in or near the ear canal, and attached to the ear or to the user's equipment. The headsets may further comprise devices for controlling power and fidelity. The disclosed invention provides an affordable, easy to use and flexible appliance for utilizing an audio device while being submerged into an aquatic environment.

50 Claims, 16 Drawing Sheets

U.S. PATENT DOCUMENTS

| | | | | | |
|---|---|---|---|---|---|
| 5,533,737 | A | | 7/1996 | Borowski | |
| 5,537,667 | A | | 7/1996 | Kenning et al. | |
| 5,570,688 | A | | 11/1996 | Cochran et al. | |
| 5,579,284 | A | | 11/1996 | May | |
| 5,586,176 | A | | 12/1996 | Peck | |
| 5,600,730 | A | * | 2/1997 | Kenning et al. | 381/77 |
| 5,610,655 | A | | 3/1997 | Wakabayashi et al. | |
| 5,706,251 | A | | 1/1998 | May | |
| 5,790,683 | A | * | 8/1998 | Salzani | 381/183 |
| 5,822,180 | A | | 10/1998 | Deschamps et al. | |
| 5,825,718 | A | | 10/1998 | Ueki et al. | |
| 5,889,730 | A | | 3/1999 | May | |
| 6,396,769 | B1 | * | 5/2002 | Polany | 367/131 |

* cited by examiner

SYSTEM FOR HOUSING AN AUDIO SYSTEM IN AN AQUATIC ENVIRONMENT

RELATED APPLICATIONS

This application claims priority to and is a continuation-in-part of U.S. patent application Ser. No. 09/411,983, filed Oct. 4, 1999, now U.S. Pat. No. 6,396,769, the disclosure of which is incorporated herein by reference in its entirety.

BACKGROUND OF THE INVENTION

1. Field of the Invention

This invention relates in general to water resistant housings, and in particular, to housings that serve as portable systems for containing and delivering audio media players while conducting underwater activities at depths exceeding atmospheric pressure.

Scuba diving has increased in popularity as a recreational hobby over the decades. Currently, there is no reliable technology that will allow for the use of a personal and portable underwater or near-surface music system while engaged in physical activities in environments where aquatic pressure exceeding atmospheric pressure is encountered. The emergence of lightweight and diminutive portable audio players such as compact disc, minidisk, and MP3 players have made feasible the enjoyment of music while engaging in physical exercise, sporting events and other outdoor activities. Such audio playing devices are not constructed to withstand being submersed and pressurized by an aquatic environment.

The following disclosure relates to a system for a submersible audio housing system adapted for scuba diving and near surface activity. The disclosure provides a system that functions while being submersed, due to the maintenance of a hydrostatic seal against extreme aquatic pressure. The disclosure further provides methods for stimulating the user's audiosensory systems underwater, via such methods as ultrasonic frequency and bone conduction and by way of analog or digital cables, or wireless technology. The unit is portable, so as not to infringe upon the privacy of others. The disclosure also provides a headset comprising water and pressure resistant audio speakers that are compatible to use with a diving hood, and capable of compensating for the water's dampening effect on certain frequencies. The invention disclosed herein is easy to use, inexpensive and easily repaired and updated.

2. Description of the Related Art

The following prior art disclosures are provided as a background to the invention disclosed herein, and should not be construed as limiting the scope of the invention claimed. The following disclosures are incorporated by reference in their entirety.

Williams (U.S. Pat. Nos. 5,456,377 and 5,533,737) disclose a system for enclosing electrical outlet fixtures and serves as a method of weatherproofing power plugs. This concept of enclosing an electrical system is further adapted by enclosing complete electric devices.

Deschamps (U.S. Pat. No. 5,822,180) discloses a water-resistant cabinet for electrical devices and components. This device is constructed from a plurality of mounting plates and is sealed internally with glue. A door is assembled to the frame, which pivots on hinges, and can be closed to make watertight seals. The structure is perforated to form a duct for passage of wiring to the internal components. Molzan (U.S. Pat. No. 4,465,189) discloses a waterproof container. The container is designed for small objects and is made of deformable material made to collapse around the internal equipment under environmental pressure. Risko (U.S. Pat. No. 5,386,084) discloses a means of enclosing an electronic device using a flexible membrane and a battery access door. The above mentioned containers are designed to seal equipment containers against water and moisture. However, the structures are not designed for underwater use, especially under conditions experienced while diving.

Kamata (U.S. Pat. No. 5,285,894) discloses a waterproof casing suitable for housing a camera. The device uses a non-woven air-permeable fabric material to allow air, but not water, inside the container. Furthermore, other structural deficiencies prohibit this device from being a reliable mechanism for housing an electrical device while experiencing a pressurized environment. Johnson (U.S. Pat. No. 5,239,323) discloses a waterproof bag mechanism for housing a camera. The disclosure is designed for environments that are wet, but not involving environmental pressure.

In order to deal with the pressure of the environment altering the structure of the housing and crushing the internal components, containers have been made that utilize flexible membranes that have been internally pressurized. Gell (U.S. Pat. No. 4,771,299) discloses a flexible, waterproof container that can be internally pressurized. This device is complex, bulky, costly, and requires peripheral technology to pressurize the unit. In addition, it is highly susceptible to failure because of the potential for perforation of the flexible membrane, thereby causing the entire compartment to flood and destruction of the device within.

To solve the problem of an expensive and puncture prone pressurized flexible membrane, rigid housing systems have been disclosed. Monterio (U.S. Pat. No. 4,281,343), Wakabayashi (U.S. Pat. No. 5,294,988), Matsumoto (U.S. Pat. No. 5,325,139), and Breslau (U.S. Pat. No. 4,381,144) disclose systems using rigid materials to house a video camera. Although these devices are suitable for maintaining a seal in a hydrostatic environment, they do not serve the function of a containing an audio electronic device and delivering the sound to the users.

The concept of rigid housings has been further adapted to house audio components in wet environments. Delage (U.S. Pat. No. 4,562,590) discloses a device that will contain an entire stereo and loudspeaker system. The design is a container with a removable lid that exposes the stereo system. In this way a stereo system can be transported in a wet environment and avoid damage. The system may be suitable for near surface activity, but the design in not adapted for full submersion into a pressurized aquatic environment.

Hofer (U.S. Pat. No. 4,949,806) discloses a headset for underwater use. The device is susceptible to easy destruction because of the ability of water and other debris in the medium to flow close to the circuitry. The device is capable of emitting a limited frequency range based on a single bone-conducting speaker. In contrast, the system disclosed herein embodies the use of single or multiple speakers of various types and frequency ranges, and capable of compensating for the dampening effects of water. The speaker concept has been further described in Rappaport et al. (U.S. Pat. No. 4,727,599) disclosing a headband to contain the speakers and radio system, and Kenning et al. (U.S. Pat. No. 5,537,667) disclosing a swimming training cap with embedded speakers.

Goldfarb (U.S. Pat. No. 4,682,363) discloses an amphibious personal audio system for swimmers. A disadvantage of the application of this device to underwater activities is that the earphones are inserted into the user's ears, thus pressing into the ear canal and preventing pressure equilibration. Furthermore, the speakers are worn as a headband, thus interfering with the strap of a mask and preventing the use of a hood. In addition, the structural design describes a flexible membrane that cannot withstand hydrostatic pressure. Thus the disclosed invention is not useful in pressurized environments, or under low temperature conditions that require the use of a hood.

Further improvements have been made, wherein flexible membranes allow for improved aquatic protection. This has made it possible for audio devices to function while the user is swimming. Fuller (U.S. Pat. No. 4,584,718), Silverman (U.S. Pat. No. 4,683,587) and Olsen (U.S. Pat. No. 4,456,797) disclose flexible membrane housings for a personal stereo and speaker system with conical type earphones which the user inserts into the ear canals. As mentioned above, the design of conical ear plugs is not appropriate for diving because the ambient pressure will force the ear plugs deep into the ear canal causing pain and tissue damage. Second, a flexible membrane will compress around the device causing all the buttons to be pressed, and possibly implode the device. Thus, these devices are not suited for the pressurized environments encountered while diving, but have limited utility for near-surface activities.

Peck (U.S. Pat. No. 5,586,176) and May (U.S. Pat. No. 5,889,730) disclose underwater communication systems that use head-mounted speaker systems connected to underwater transceivers/receivers for audio communication amongst divers. These devices are not described to be coupled to a portable audio device but rather for voice communication between divers.

Regardless of the merits, features, or advantages of the above-cited references, none of them achieves, or fulfills, the purposes of the present invention.

SUMMARY OF THE INVENTION

The invention disclosed herein generally relates to a system for using a personal and portable audio device in an aquatic environment. In one embodiment, the audio device is contained within a rigid container capable of withstanding the pressure encountered while submerged into an aquatic environment. In a preferred embodiment, the rigid container is provided with a removable lid for easy removal or service of the device contained within. In another preferred embodiment a waterproof seal is positioned between the lid and container to prevent entry of water into the closed container. In a most preferred embodiment, said seal is capable of withstanding underwater pressures exceeding one atmosphere.

The invention embodies the use of components to secure the lid to the container and to close the seal between the lid and container. In a preferred embodiment, said components comprise safety features preventing accidental opening of the lid during aquatic use.

The invention further comprises components which prevent water from reaching and damaging the audio device. In a preferred embodiment, the interior of the container is provided with water-absorbing material. In another preferred embodiment the container is provided with internal walls creating waterproof chambers or compartments. In yet another preferred embodiment, the container is provided with a pressure release valve to compensate for the effect of increased depth on the container's internal pressure and its configuration. The invention further comprises the use of a vacuum release valve to facilitate opening of the lid.

In a further embodiment of the invention, the container harbors a moisture sensor to detect leakage of the container. Such sensors may include, are not limited to, electrical or chemical.

The invention further comprises the use of an internal lighting source to illuminate the device contained within. Such lighting sources may be electrical or chemical, and mounted on the outside or inside of the container. In a preferred embodiment, the electrical lighting source is powered by a battery.

The invention further embodies the use of additional components for monitoring the operation of the audio device within the container. Such systems may be visual or electrical. In one preferred embodiment, the container is manufactured partially from a transparent material. In another preferred embodiment, the container harbors circuitry that is capable of monitoring the electrical operation of the audio device.

In a further embodiment of the invention, the device within the container is an audio transmitting device. The invention embodies the use of any audio device including, but not limited to audio player, MP3 player, CD player, cassette player, DVD player, communication device, telephone, cellular telephone, radio receiver, radio transmitter, computer, laptop computer, palm pilot, personal digital assistant, pager, measuring device, geiger counter, sonar, pH meter, thermometer, luminometer, and magnetometer. In a most preferred embodiment, the audio device recites information on underwater sightings and points of interest relating to a specific underwater location.

In one embodiment of the invention, the container is provided with one or several straps for attachment to the user or the user's equipment. In a preferred embodiment, the container is provided with external features facilitating attachment to the user's body.

The invention further embodies components for manually and externally controlling the device within the closed container. Such control devices may comprise both external and internal components. In a preferred embodiment, the external control components are capable of horizontal and vertical movement, and capable of generating both horizontal and vertical movement of the internal components of the controlling device. In one embodiment the container or lid harbors one such external control device. In a preferred embodiment the container or lid harbors multiple external control devices. In a most preferred embodiment, the container or lid harbors a number of control devices spatially arranged so as to optimally operate the controls of a specific audio device within the container.

In a further embodiment of the invention, components for connecting the internal audio device to an audio jack are provided. In a preferred embodiment, the audio jack is attached to the container.

In a further embodiment of the invention, components connecting the audio jack to an audio communication link are provided. In a preferred embodiment, the components connecting the audio jack to the audio communication link are comprised of a male hydraulic nipple; a female hydraulic coupling; and a locking bearing mechanism. In a most preferred embodiment, the components connecting the audio jack to the audio communication link are internally sealed.

In a further embodiment of the invention, the audio communication link is connected to a device capable of generating audible sound. Said audio communication link may transmit an analog or digital signal. In one embodiment, the audio communication link is provided with a volume control. In a preferred embodiment, said volume control operates as a resistor. In another preferred embodiment the audio control comprises an amplifier. The invention embodies the use of several devices capable of producing audible sound. In one preferred embodiment, the sound-generating device is a speaker. In another preferred embodiment the sound-generating device is a bone-conducting device.

The invention further embodies an underwater headset comprising at least one speaker within a waterproof enclosure, wherein said at least one speaker is adapted for vertical and horizontal positioning. In a preferred embodiment, the at least one speaker is mounted on a member capable of horizontal and vertical movements. In another preferred embodiment, at least one speaker is capable of operating with a frequency between 290 Hz and 10 kHz. In one embodiment, the waterproof enclosure comprises a water-resistant membrane. In a preferred embodiment, the headset comprises one or more control devices such as an on/off switch, a volume control or an amplifier. The invention further embodies an underwater headset comprising at least one speaker within a waterproof enclosure, wherein said at least one speaker is mounted on a frame that attaches to the ear. In a preferred embodiment, the speaker is inserted into the ear canal. In a most preferred embodiment the waterproof enclosure is made from a flexible material. In a preferred embodiment, the headset comprises one or more control devices such as an on/off switch, a volume control or an amplifier. In yet another preferred embodiment, at lest one speaker is capable of operating with a frequency between 290 Hz and 10 kHz. The invention further embodies the use of different types of electrical speaker elements in said headsets, including but not limited to, piezoelectric, magnetic, bone conducting, ultrasound and electrostatic transducers.

BRIEF DESCRIPTION OF THE DRAWINGS

The features and advantages of the present invention, and a manner of attaining them, will become more apparent by reference to the following descriptions of one embodiment of the invention. The following drawings represent one means of attaining the invention disclosed herein, and should in no way be construed as limiting the scope of the invention claimed.

FIG. 6 is an schematic representation of an exemplary latch which may be used to secure the lid to the housing.

FIG. 9 is an schematic representation showing another embodiment of the housing of FIG. 1.

FIG. 10 is 3-dimensional rendering of an exemplary frame for attaching the speaker housing of FIG. 5 to the strap of a diver's mask.

DETAILED DESCRIPTION OF THE PREFERRED EMBODIMENTS

Figure 1:
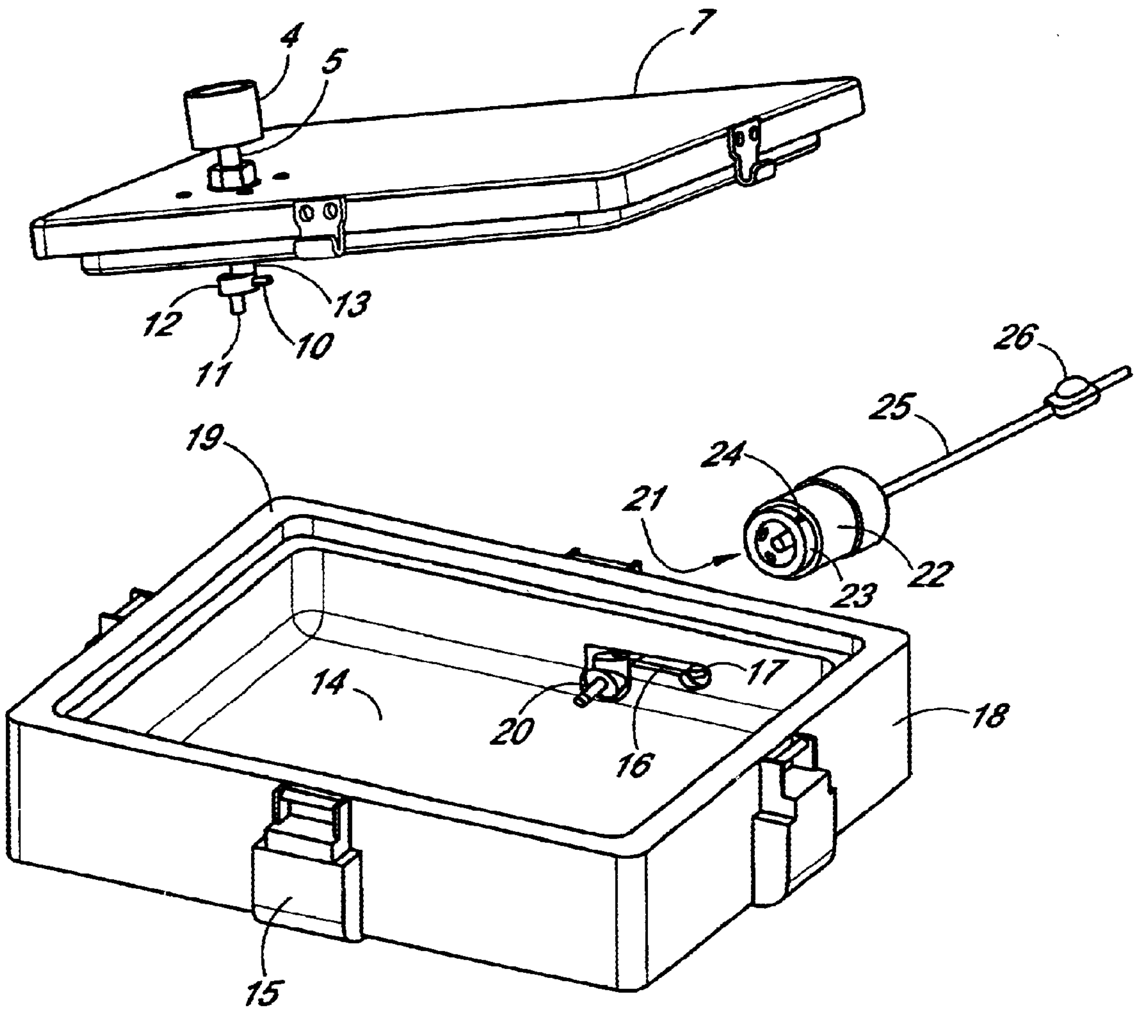
FIG. 1. An isometric view of the housing system and audio coupling unit.

The invention disclosed herein generally relates to a system for using a personal and portable audio device in an aquatic environment. Current technology does not allow for the submersion of audio devices into aquatic environments, especially under such pressure conditions as encountered by a diver. Furthermore, there exists only limited technology for the transmission of audio waves to a user submerged in such an aquatic environment. The advent of miniaturized electronic devices such as audio players and communication equipment has made feasible the individual use of such devices during recreational and educational activities. Herein is disclosed a system for using a personal portable audio device while being submerged into an aquatic environment.

The invention embodies a rigid container capable of withstanding the pressure encountered while submerged into an aquatic environment. Such a container can be made from any material capable of withstanding pressure, including but not limited to metal, ceramics, glass, rubber or plastic compositions.

The invention further embodies providing the rigid container with a removable lid, for easy removal or service of the device contained within. In a preferred embodiment, at least one waterproof seal is positioned between the lid and container to prevent entry of water into the closed container. In a most preferred embodiment, said seal is capable of withstanding underwater pressures exceeding one atmosphere. One skilled in the art is aware of multiple ways of providing a waterproof seal between a lid and a container. Without intent to limit the scope of the invention disclosed herein, such seals may consist of one or more of the following: an o-ring, rubber lining, or a silicon-based gel. In a preferred embodiment, at least one o-ring seal is positioned within a recessed groove along the perimeter of the lid's underside. In a more preferred embodiment, the lid is provided with two levels. Level two is positioned within the step provided by the container box and above the device, adding horizontal strength to the housing. The first level contains at least one o-ring seal in a recessed groove positioned between level two and the outer perimeter of the lid. Said lid may further be removable, or attached to the housing using hinges or similar devices.

The invention further embodies the use of components to secure the lid to the container and to close the seal between the lid and container. A person skilled in the art is aware of multiple devices with which to secure a lid to a container, including buckles straps or clips. Such locking devices may be positioned on the lid, on the container, or may be positioned on both the lid and the container. In a preferred embodiment, the locking components comprise safety features preventing accidental opening of the lid during its use. Such safety features include any design with the intended purpose of preventing accidental opening of the lock, for example catches, push pins and rotary dials. In a most preferred embodiment, a buckle is specially designed to lock when snapped shut. In some embodiments, to unlock the device at least two fingers are required: one for holding down a safety latch and one for lifting the buckle.

Figure 2:
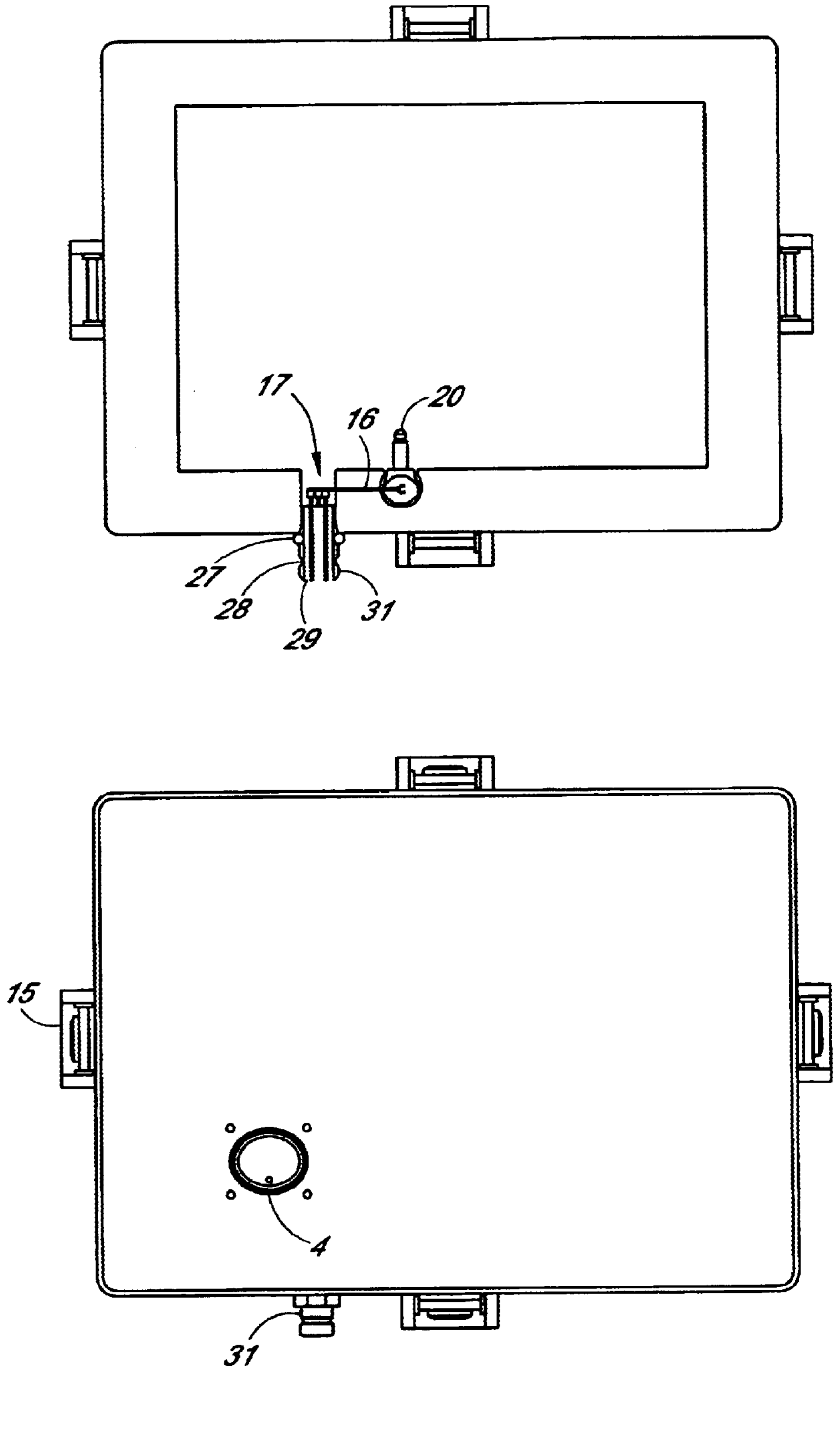
FIG. 2. A cross-section of the housing and a top view of the lid attached to the housing.
Figure 3:
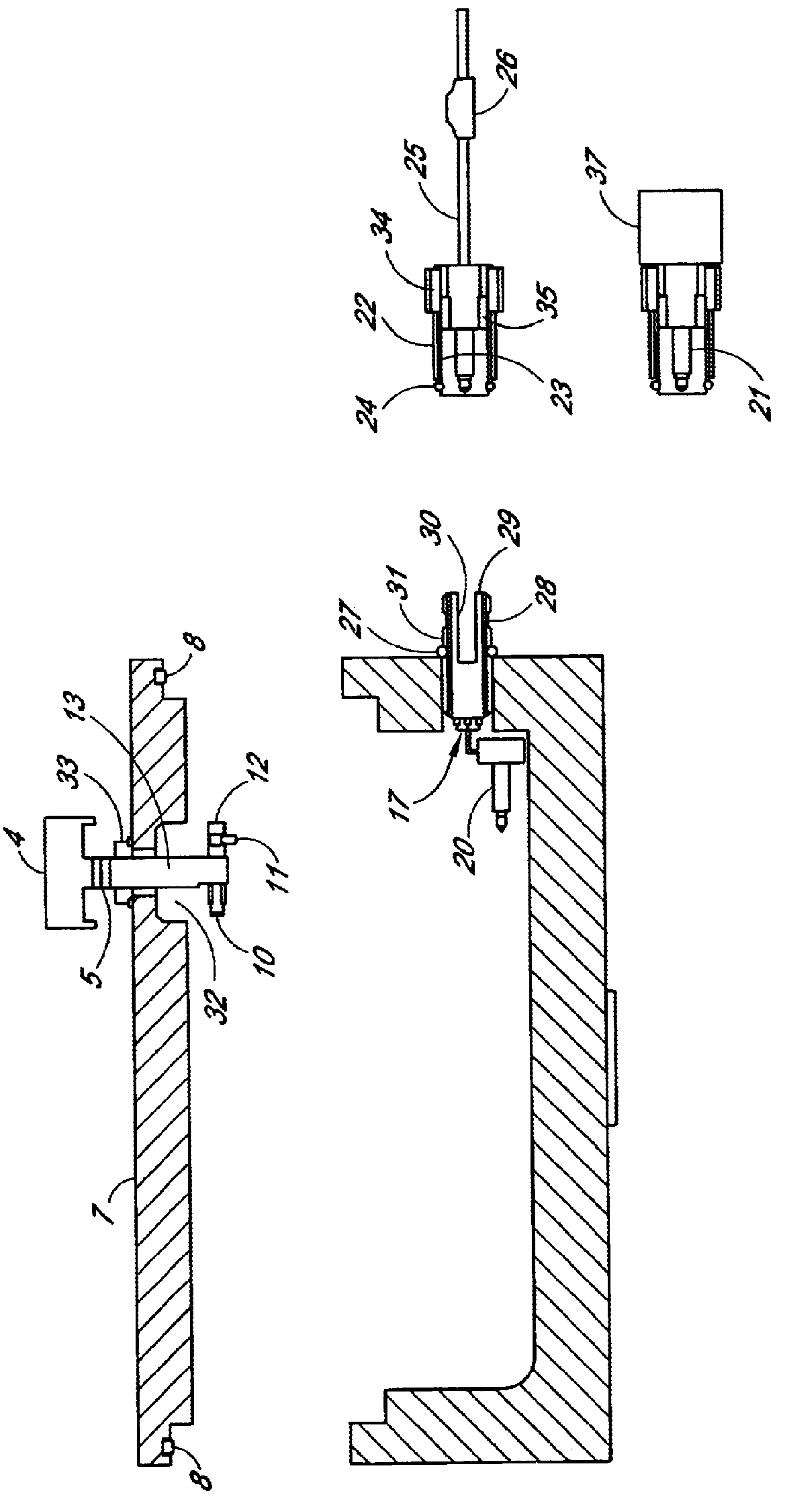
FIG. 3. A cross-section of the subject matter of FIGS. 1 and 2.

Without limiting the scope of the invention disclosed herein, one preferred embodiment of the disclosure is depicted in FIGS. 1 to 3. The submersible housing system of FIG. 1 is a container unit with a bottom, front, back, left, and right side designed to snugly contain an electronic device. The lid 7 is made of a rigid material, preferably clear, that fits over the top 19 left, right, front, and back edges of the container. In the face down side of the lid 7 is an o-ring 8 that sits in a recessed groove along the perimeter of the underside of the lid 7. The compression contact between the o-ring 8 and the top edge 19 of the housing provides the hydrostatic seal. The lid has two levels as seen in FIGS. 1 and 3. Level two is designed to sit above the device and within the step provided in the container box. This will serve the function of adding horizontal strength to the housing and ensuring the prevention of a change in structure, which could result in a break of the hydrostatic seal, causing a leak. The first level is designed to contain the o-ring 8 in a recessed groove located between level one and the outer perimeter of the lid 7 on the face down side. This o-ring 8 will be compressed on the perimeter of the top 19 of the container box to make a seal that is not only water resistant and waterproof, but also submersible to one or more pressures absolute while maintaining a hydrostatic seal against the environment.

Figure 6:
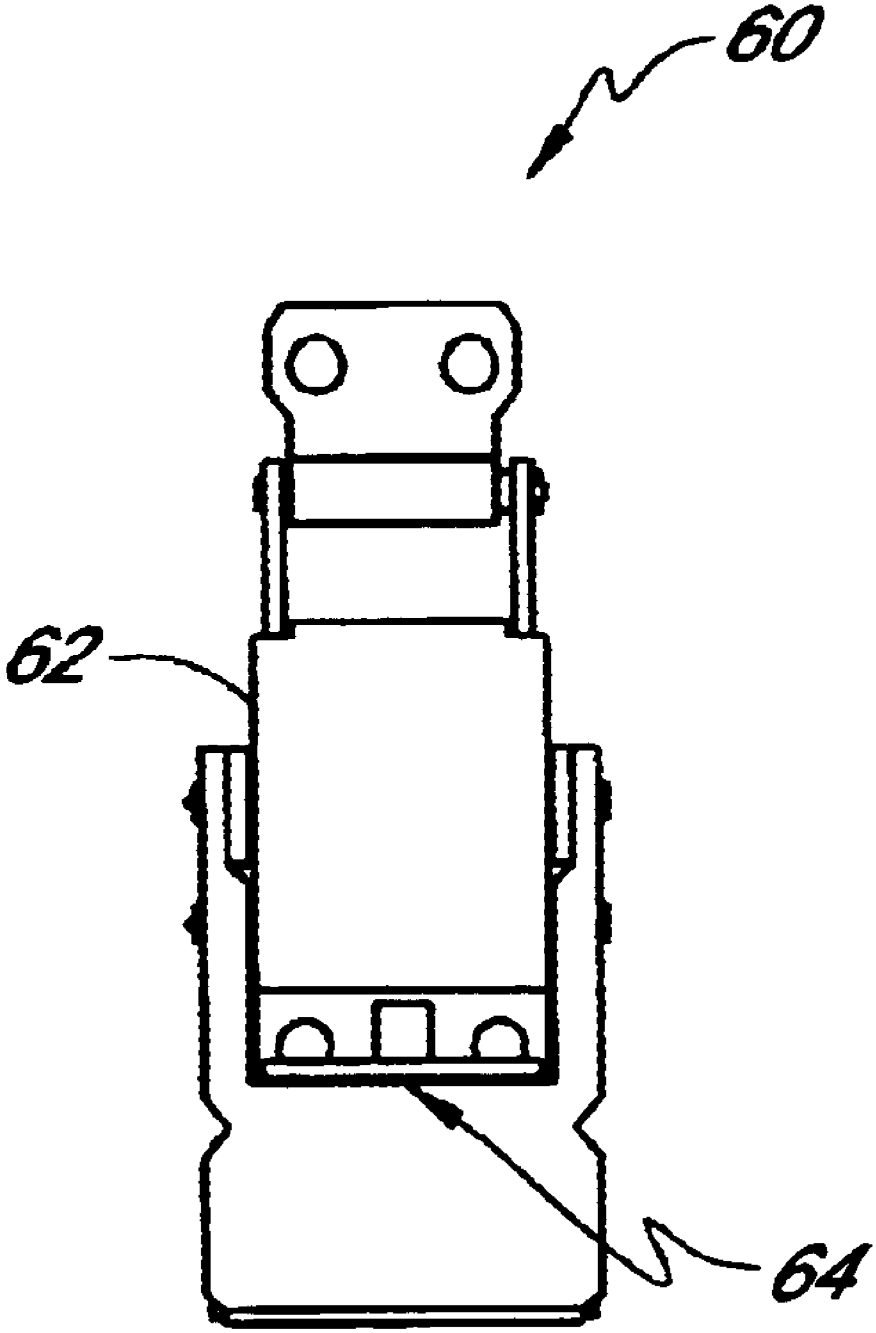
FIG. 6.

In order to secure the seal, the preferred embodiment will contain buckles 15 located on the peripheral exterior that will snap and lock the lid to the container. Such a buckle is manufactured by NEILSEN/SESSIONS® and is specially designed to lock when snapped shut, thus preventing accidental unsnapping of the buckle that could potentially release the lid from the container breaking the hydrostatic seal. To unlock the device, two fingers are required: one to hold down the safety latch down while the second finger lifts the buckle. FIG. 6 shows an exemplary latch 60 that may be alternatively used to perform the functions of buckles 15. Latch 60 may be, for example, a compression spring catch such as that manufactured by NIELSEN/SESSIONS® under product number I-HC83314-42LALBSS. In order to completely release latch 60, an operator (in this case a diver) must actuate a primary catch 62 as well as a spring loaded mechanism 64 (i.e., a secondary catch). If both catches 62 and 64 are not released, the latch 60 will not open. Hence, the design of latch 60 both ensures that the lid remains securely attached to the housing, and that the latch 60 will not be accidentally released.

In some embodiments, the device of the present invention comprises one or more components that prevent water from reaching and damaging the audio device. Such components may act to prevent a leakage from occurring, or to reduce the damage of water should a leak have occurred. Such components may include external shock-absorbing structures, pressure release valves, multiple seals, internal walls creating waterproof compartments or chambers, and water-absorbing materials within the container.

Figure 7A:
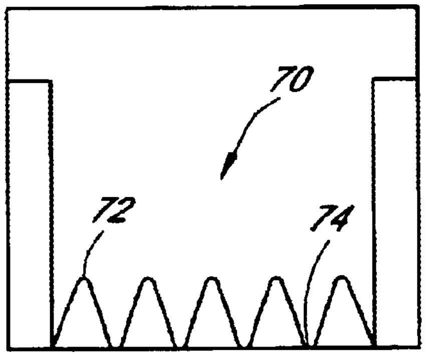
FIG. 7A is a cross-section of an embodiment of the housing comprising multiple peaks and troughs for protecting the device therein from water.
Figure 7B:
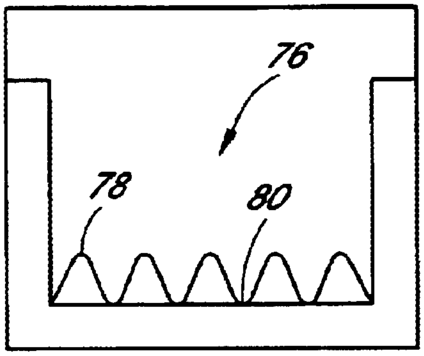
FIG. 7B is a cross-section of an embodiment of the housing comprising a removable lining for protecting the device therein from water.

FIGS. 7A–7D show alternative ways to adapt the lid 7 and the container shown in FIG. 1 to protect the audio device from water damage. FIG. 7A shows a cross-section of the container depicted in FIG. 1 having a surface 70 in the form of multiple peaks 72 and troughs 74. In this example, the surface 70 would be part of the housing itself, i.e., manufactured as one integral unit. An audio device would rest upon the peaks 72, thereby being isolated from any leaked water, which would pool in the troughs 74. FIG. 7B shows a cross-section of the housing having a protective surface 76 which resembles the structure shown in FIG. 7A. In this embodiment, however, the protective surface 76 would be a removable lining, i.e., not necessarily built into the housing. Such a protective surface 76 may be attached to the housing with an adhesive, for example. Protective surface 76 may be made of a water absorbing and resilient material in order to protect the device from both water damage and mechanical shocks. Similarly to the surface 70 described above, surface 76 would allow for the device to sit atop the peaks 78 while the water is collected and absorbed at the troughs 80.

Figure 7C:
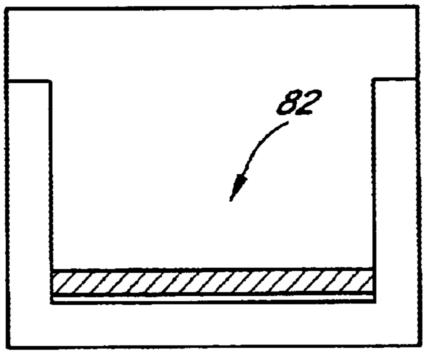
FIG. 7C is a cross-section of an embodiment of the housing comprising a water absorbing material

FIG. 7C shows yet another embodiment of the housing depicted in FIG. 1 having a protective surface 82. In this example, protective surface 82 is a lining of water absorbing material. Such water-absorbing materials include all compounds with desiccant or hydrophilic properties or any material with water-absorbing capacity, for example provided in the form of fabrics, sponges, foams, powders, pellets or similar. Said material may be of synthetic or organic origin, or a combination thereof.

It should be noted that while the examples discussed above show only one surface of the container having the respective protecting structure 70, 76, and 82 this need not be the case. Rather, the protective structures can be on a portion of a single surface or on more than one surface or portion thereof. Thus, such protective structures may cover additional, if not all, surfaces of the container. Accordingly, the protective structures may be positioned at any desired location. Moreover, a person of ordinary skill in the art will recognize that the various protective structures 70, 76, and 82 (i.e. integral peaks and troughs, removable linings, or water absorbent materials) may be combined in a number of ways in a single housing unit. Hence, for example, the sides of the housing may be covered with protective surface 82 (water absorbing material), the top-inner wall of the unit may incorporate protective surface 70 (integral peaks and troughs), and the bottom-inner wall of the unit may be lined with protective surface 76 (removable lining).

Figure 7D:
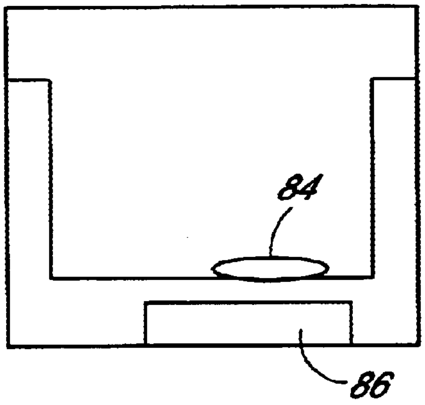
FIG. 7D is a cross section of an embodiment of the housing comprising a one-way valve

FIG. 7D shows yet another embodiment of the housing having features to protect the internal unit from water damage in case of a water leak. In this embodiment, a one-way valve 84 is affixed to an inner surface of the housing unit. The one-way valve 84 allows water to pass from the inside of the housing to a water storage chamber 86. Since the one-way valve 84 allows passage of water in only one direction, the audio device is protected from water leakage in that the leaked water is removed to and stored in the chamber 86. A person of ordinary skill in the art will recognize that a variety of commercially available one-way valves may be used, and that the size, shape, and location of the chamber 86 may vary according to the desired design of the housing.

The invention may further include the use of safety devices designed to increase the internal gaseous pressure of the container in case of a water leak. Without intent to limit the scope of the invention, such devices may include pressurized gas released upon leakage or chemical compounds, such as carbides, that produce gases upon exposure to water. In some embodiments, the invention comprises the use of one-way valves to reduce or increase the gaseous pressure within the container. The invention embodies the use of any waterproof contrivance capable of conveying a one-direction flow of gas including, but not limited to, pressure release valves and vacuum release valves. In a preferred embodiment the one-way valve is capable of withstanding the aquatic pressure exceeding one atmosphere.

In some embodiments, the invention comprises a moisture sensor within the container to detect water leakage into the container. One skilled in the art is aware of multiple types of sensors designed to detect an increase in humidity or moisture. The invention embodies any electrical moisture detection device including but not limited to led sensors or conductivity meters, and any chemical means of detecting moisture including, but not limited to, chromophoric substances.

In some embodiments, the invention comprises an internal lighting source to illuminate the device contained within. The invention is not limited to any particular source of light waves, but embodies any device that would achieve the intended purpose. For example, lighting sources include any electrical, chemical or biological process of producing light within the visible range. Such lighting sources may be mounted either on the outside or the inside of the container, or both. In some embodiments, fluorescently or similarly labeled components are used within or outside of the container to illuminate the device or to make one or more components of the device, for example the control knobs, visible under conditions of limited light.

In some embodiments, the device includes components for monitoring the operation of the audio device within the container. Such systems include, but are not limited to, visual, chemical and electrical. In one preferred embodiment, the container is partially manufactured from a transparent material. Such materials include, for example, glass, plexiglass or plastic. In another preferred embodiment, the container harbors circuitry that is capable of monitoring the electrical operation of the audio device. Such circuitry includes, but is not limited to, power meter, voltage meter, resistance meter and thermometer. For example, the circuitry may indicate whether a battery used to power the audio device is running low or to monitor other aspects of the operation of the audio device. In some embodiments, the device comprises components for communicating information on the operation of the electrical device to the user. Without limiting the scope of the invention claimed herein, such means include generation of audio signals and light signals, and visualization of instrument readings on a LED or similar display.

The invention embodies use of the container with any conceivable device capable of producing an audio signal or an audible sound. The invention embodies the use of any audio device including, but not limited to audio player, MP3 player, CD player, cassette player, DVD player, communication device, telephone, cellular telephone, radio receiver, radio transmitter, computer, laptop computer, palm pilot, personal digital assistant, pager, measuring device, geiger counter, sonar, pH meter, thermometer, luminometer, and magnetometer. In a most preferred embodiment, the audio device produces information on underwater sightings and points of interest relating to a specific underwater location. Such information may be stored on the audio device, or be received by the device from a source outside of the housing. For example, the information provided to the audio device or stored on the audio device may be used to provide an underwater tour of a specific location. In some embodiments, the device of the present invention comprises internal circuitry capable of receiving information from external devices such as a dive computer. In a preferred embodiment, the information received is communicated through the circuit to the user by, for example, light signals or audio signals.

Figure 8A:
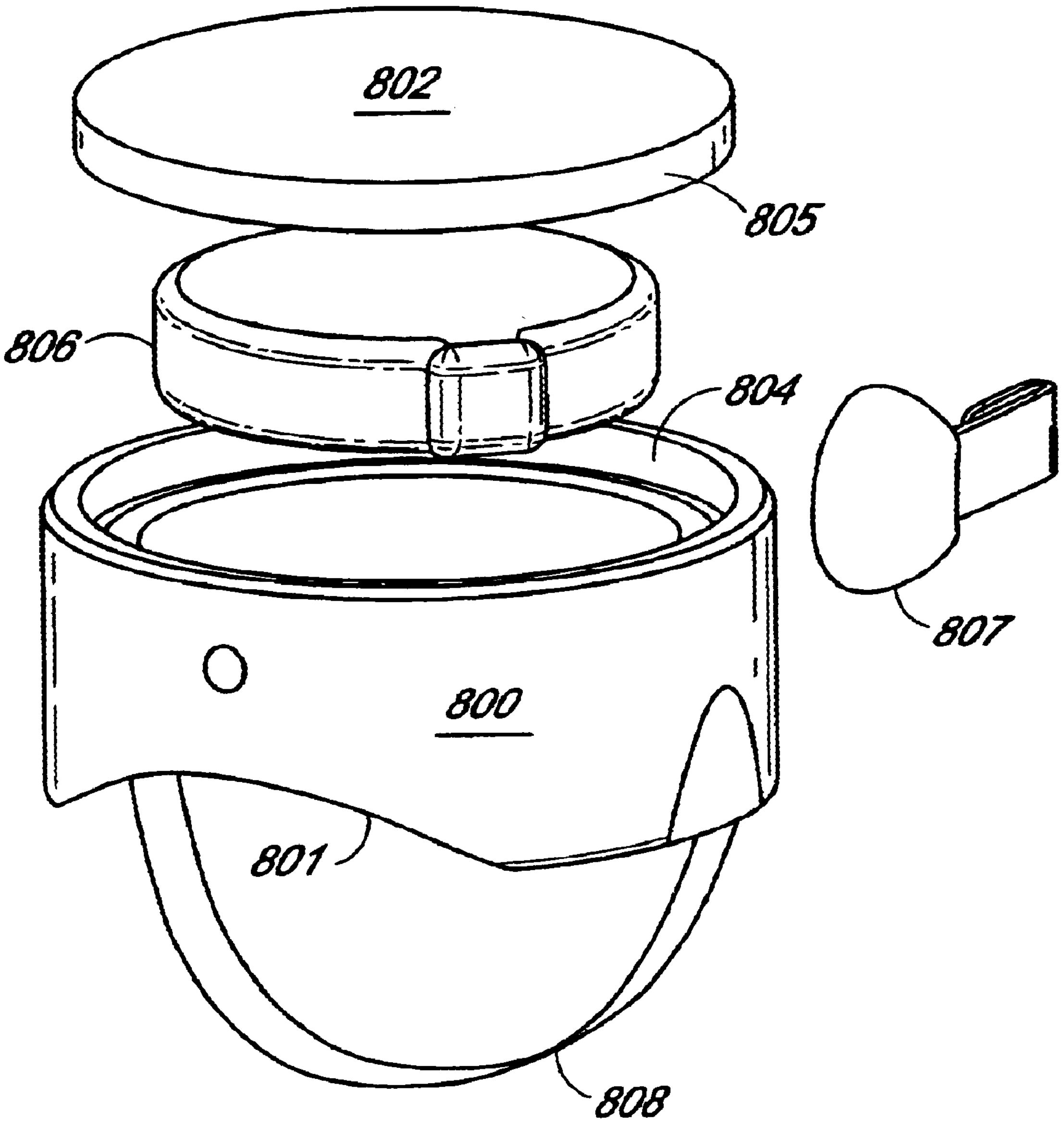
FIG. 8A is a three dimensional exploded view of an embodiment contoured to fit on the thigh and to hold a circular device.

In some embodiments, the device comprises components for attaching the container to the user's body or equipment. Such attachment features include, for example, straps, clips, hooks and various materials with adherent properties such as glue or tape. In one preferred embodiment, the container is provided with external features facilitating attachment to the user's body, for instance providing the container with an outer surface shaped to fit an appendage or other area of the body to which it is desired to affix the device. The container may be adapted to fit a leg, an arm or the thorax. FIG. 8A shows an example of a container 800 having a contoured surface 801 designed to fit over a thigh of a user. The contoured surface 801 may be pre-molded into the housing, or may be provided as a detachable piece that can be attached or removed depending on the type of use. In some embodiments, the features for attaching the device to the user's body may comprise a rigid surface configured to comfortably fit on the desired portion of the body or the features for attaching the device to the user's body may comprise flexible components which conform to the desired portion of the user's body. In the example of FIG. 8A, an elastic strap 803 is used to attach the container to the thigh of a user.

Figure 8B:
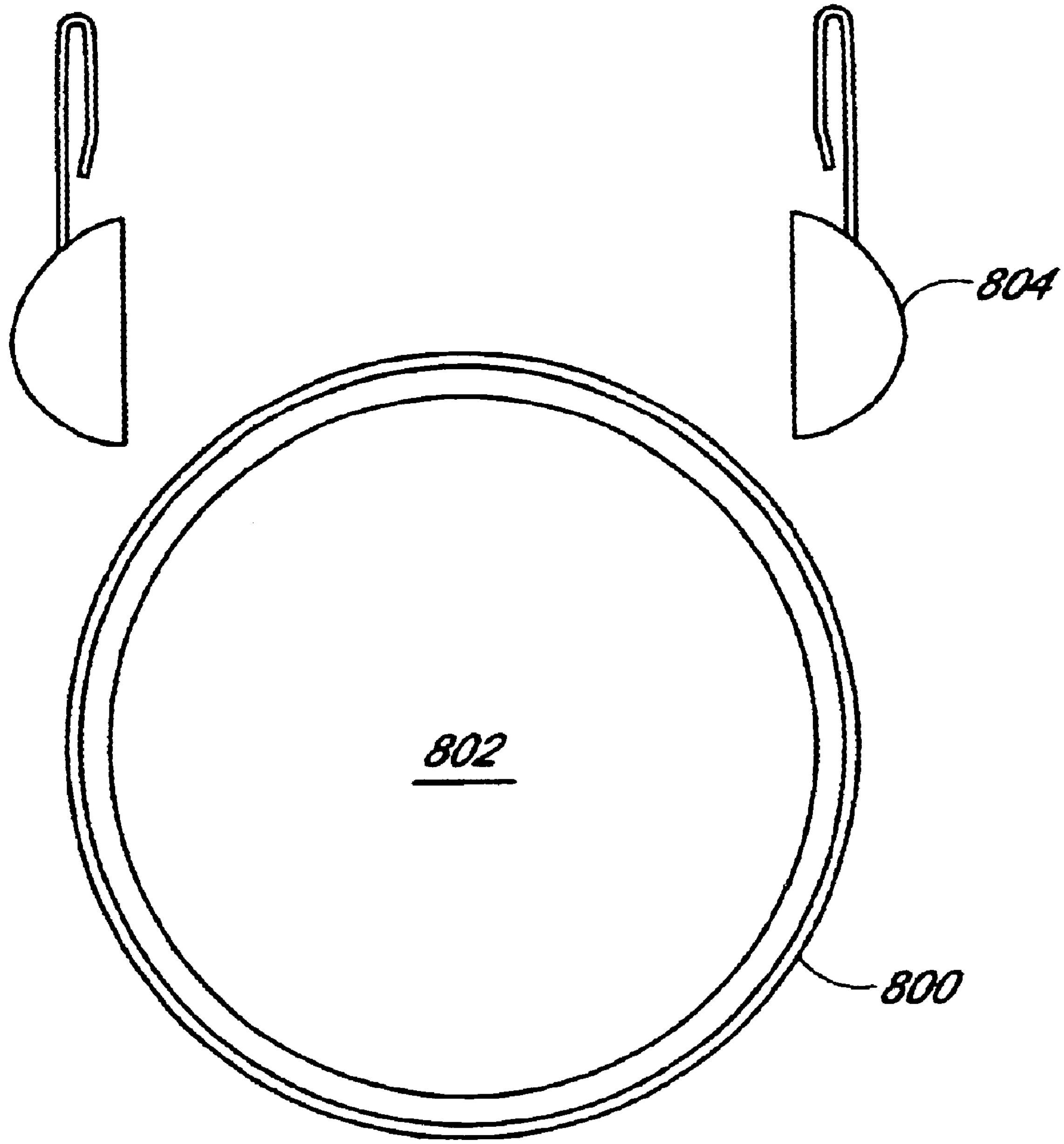
FIG. 8B is a top view of the device of FIG. 8A
Figure 8C:
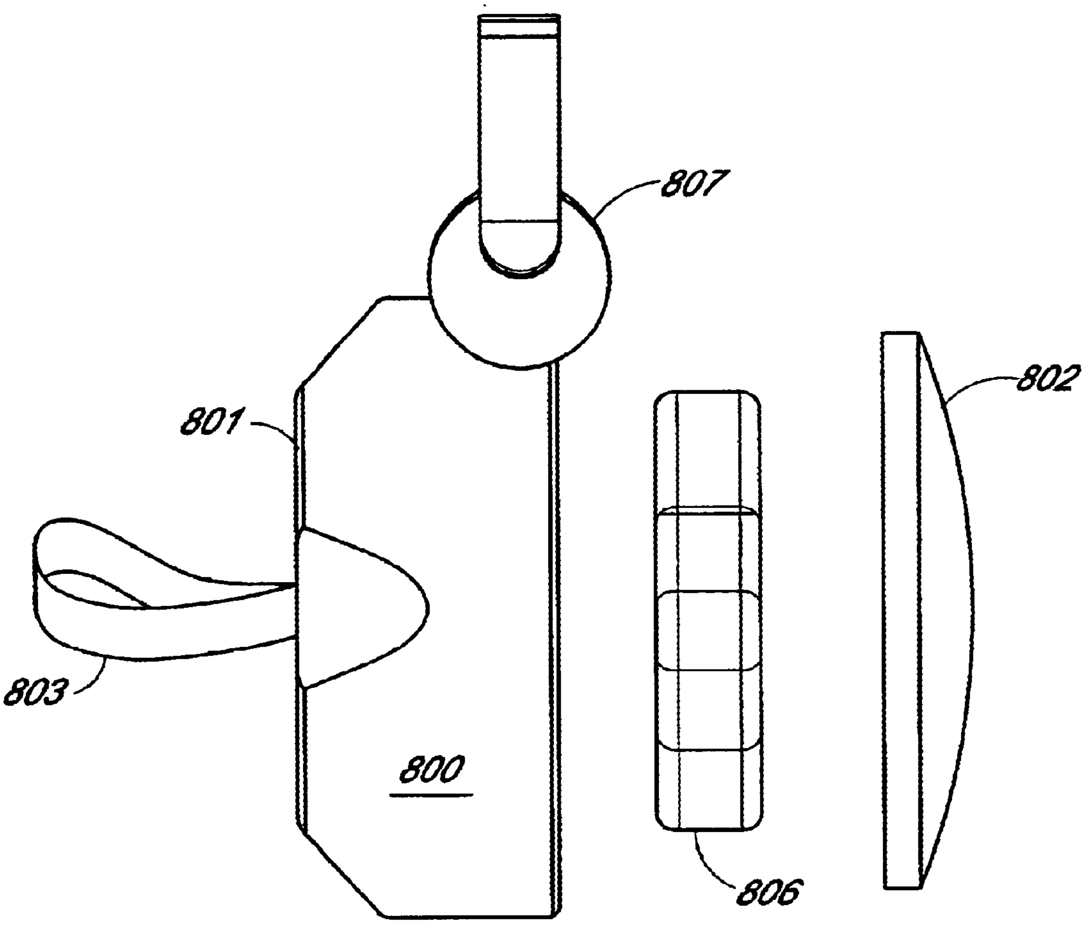
FIG. 8C is an exploded side view of the device of FIG. 8A.

With reference to FIGS. 8A–8C, an embodiment of the housing is shown having a round shape, as opposed to the rectangular shape of the housing shown in FIG. 1. In some embodiments, the round container 800 may have a threaded surface 804 to engage a threaded surface 805 on the lid 802. This embodiment allows for the storage of an audio device 806 inside the container 800 and lid 802 without the need for external latches or buckles. FIG. 8A also shows an speaker system assembly 807 to be used in conjunction with the housing and the device 806. FIGS. 8B and 8C show, respectively, the top and side views of the housing shown in FIG. 8A.

In some embodiments, the device of the present invention comprises components for manually controlling the device within the closed container. Such control devices may comprise components external to the container, components internal to the container, or both external and internal components. In some embodiments, the components are waterproof and/or capable of withstanding water pressure encountered while scuba diving. Without limiting the scope of the invention, control components suitable for manipulating the device within the container include knobs, camshafts, push pins, soft rubber moldings and electronic control devices. In one embodiment the container or lid harbors one such external control device. In a preferred embodiment the container or lid harbors multiple external control devices. In a most preferred embodiment, the container or lid harbors a number of control devices spatially arranged so as to optimally operate the controls of a specific audio device within the container. In one preferred embodiment, the external control components are capable of horizontal and vertical movement, and capable of generating both horizontal and vertical movement of the internal components of the controlling device. In a more preferred embodiment visualized in FIGS. 1–3, a control knob 4 allows the user's to rotate an internal pressing device 11 so that a push button controller on the entertainment device can be activated externally while maintaining a hydrostatic seal against the environment. In an arbitrarily located position, relevant to the device sitting in the housing system, a control knob 4 made of a rigid material is placed through the lid 7 to allow exterior manipulation of the activation devices of the device. The control knob system is a comprised of a camshaft 13 surrounded by an o-ring housing 33 with a knob 4 on the exterior end, and a hex screw 10 caddy 12 and a presser 11, on the interior end. Thus, the presser structure 11 can be positioned anywhere along a 360 degree location on a horizontal axis by turning the knob 4 in the rotation chamber 32. The vertical position can be manipulated from the exterior by pressing the knob 4. In order to deal with the constant inward pressure, an exterior spring 5 pushes the knob back up to its original position. The result is a vertical and horizontal movement control of the caddy 12 and presser 11 used to control the interior device.

Figure 9:
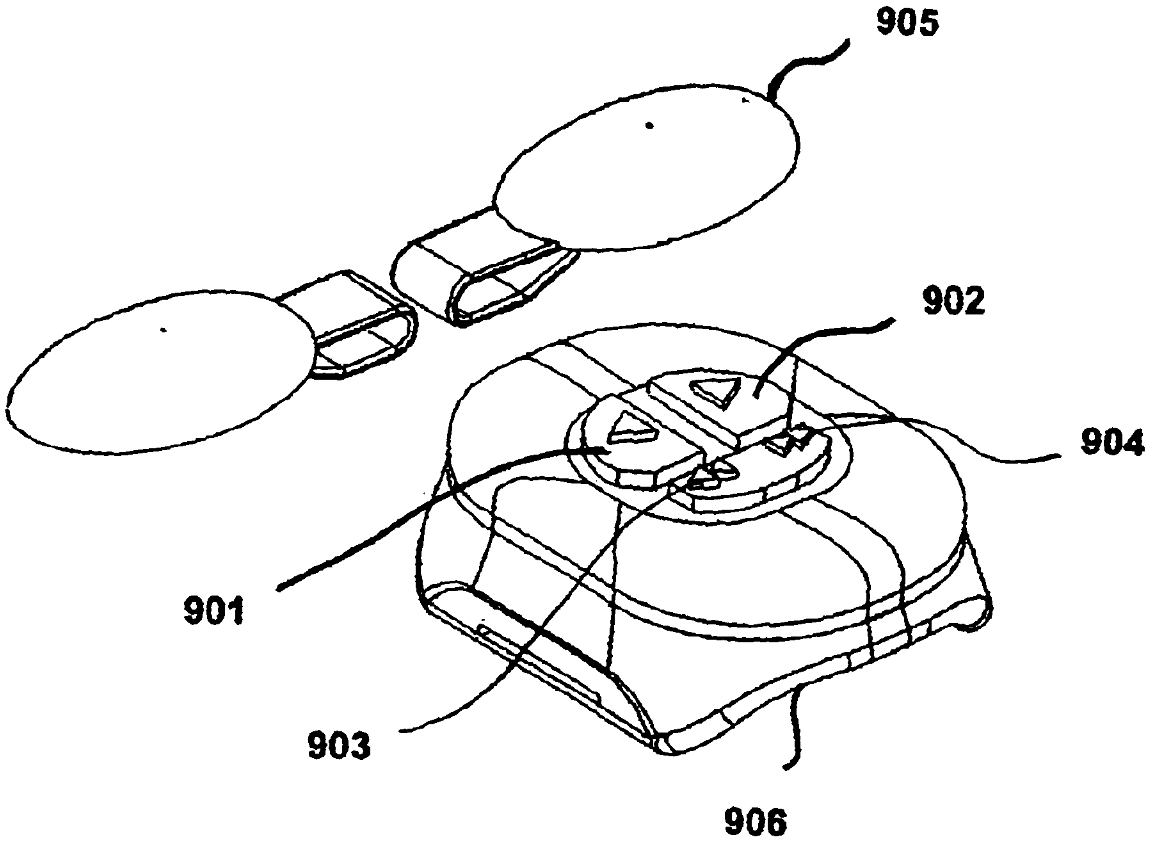
FIG. 9.

A person of ordinary skill in the art will recognize that the shape of the control knob 4 need not be limited to that already described. For example, FIG. 9 shows an embodiment of the housing unit having controls 901, 902, 903, and 904 whose shape may closely resemble the function of the control buttons on the entertainment device. Hence, control 901 may interact with the analogous "rewind" control of the audio device. Similarly, control 902 may actuate the "forward" button of the internal control device. While the external configuration of the controls of the housing may adopt any of a variety of shapes, the actuating mechanism that allows for waterproof operation may be the same as already described above. FIG. 9 also shows a speaker system assembly 905. FIG. 9 also depicts an embodiment of the housing having a surface 906 that is adaptable to be worn on an appendage, e.g., a thigh, of a user.

In some embodiments, the invention further embodies components for connecting the internal audio device to an audio output adapter, such as an audio jack, USB port, Ethernet RJ45 port, Firewire, phone jack or multipin serial connection. Such components include a cable or wireless transmission to a device capable of forming a connection with an audio communication link. In some embodiments, the invention embodies the positioning of the audio jack on the inside of, on the outside of or within the housing. In some embodiments, the invention also comprises components that are waterproof and components that can withstand water pressure encountered while scuba diving. In some embodiments, the invention comprises the use of any coupling mechanism capable of achieving the purpose of connecting the audio device to an audio communication link including, but not limited to, pneumatic coupling, threaded coupling, snap-in, push-in, lock-in and permanent. In a preferred embodiment, the wires from the stereo jack make a connection to a stereo jack adapter located in the body wall of the housing. The stereo jack adapter sits within the bore of a male hydraulic nipple that lies flush with exterior end. An o-ring between the body wall and the male hydraulic nipple establishes a hydrostatic seal.

In a further embodiment of the invention, components connecting the audio jack to an audio communication link are provided. In some embodiments, the invention also comprises components that are waterproof and components that can withstand water pressure encountered while scuba diving. The invention further comprises the use of any coupling mechanism capable of achieving the purpose of connecting the audio jack to an audio communication link including, but not limited to, pneumatic coupling, threaded coupling, snap-in, push-in, lock-in and permanent. In one preferred embodiment disclosed in FIGS. 1 to 3, a stereo jack 20 plugs into the device so that the sound is transmitted from the device through a short flexible slack of cable 16. This will allow the electronic device to be easily connected, and inserted in the housing. This also allows the flexibility and adaptability function by using any type of device that is equipped with an audio jack. The wires from the stereo jack 20 make a connection 17 to a stereo jack adapter 30 located in the body wall 18 of the housing. This stereo jack adapter sits within the bore of a male hydraulic nipple 31 that lies flush with exterior end. There is an o-ring 27 between the body wall 18 and the male hydraulic nipple 31 that establishes a hydrostatic seal. This entire stereo jack adapter is designed to screw into the body wall 18 and serves as a means of providing an easily replaceable, and fixed, pressure resistant audio jack adapter that can withstand one or more pressure absolute while maintaining a hydrostatic seal against the water environment, and, that plugs into a stereo device. Coupling to the male hydraulic nipple 31 is the female hydraulic coupler (see FIG. 3) that has a built-in stereo jack 21. The female coupler is snapped over the male hydraulic nipple 31 with a locking bearing 24 mechanism to establish a hydrostatic audio connection by means of a locking mechanism to the male coupler. This operates by sliding the outer shell 22 away from the port. This action allows the internal ball bearing 24 to slide out from the interior through the holes in the interior shell when inserting the male nipple 31 into the female coupler 21. As such, a secure connection is established. This occurs because the jack 21 that is inside the female coupler fits into the adapter 30 within the male coupler. Releasing the sliding shell 22 causes the internal spring 34 to push the outer shell 22 towards the port whereby the ball bearings 24 are once again pushed through the holes in the interior shell 23. The ball bearing 24 then fit into the groove 28 of the male coupler, preventing the two units from separating. A hydrostatic seal is established by this juncture. The female coupler contains an o-ring 35 inside to provide a hydrostatic seal capable of withstanding one or more pressure absolute. The flat, front edge, of the male coupler makes contact with the o-ring 35. When the sliding shell 22 is released and the ball bearings 24 fit in the groove 28, it initiates a small degree of compression on the juncture that drives the front edge of the male coupler deeper into the internal o-ring 35 of the female coupler. Thus, a hydrostatic seal is established that provides for a pressure resistant and waterproof juncture between the male and female adapters. This unit has the benefit that it can rotate around the axis without breaking the seal. In addition, this unit will allow the user to completely disengage and reestablish the connection underwater without flooding and damaging the interior of the housing because the male and female hydraulic couplers are completely internally sealed components. The male coupler contains a solid flexible filling 29 such as silicone or rubber, which prevents water from entering. The female coupler contains a thick o-ring 35 internally. This is important because if for any reason the cable pulls apart from the housing then the housing unit will not flood and destroy the electronic device.

In some embodiments, the device of the present invention comprises an audio communication link between the housing and a device capable of generating audible sound. Without limiting the scope of the invention disclosed herein, said audio communication link may transmit any signal capable of being converted into audible sound, including audible sound itself. The link may further convey an analog or digital signal. It may be comprised of any material capable of conducting an electronic signal, including copper, silver and gold, or a material capable of conducting a digital signal such as a fiberoptic cable. In one preferred embodiment, the audio communication link is provided with a volume control. The term volume control as used herein is intended to include any device capable of regulating the value or strength of the signal generated by the audio device, including but not limited to variable resistors and power amplifiers. In another preferred embodiment, the audio control comprises a device capable of amplifying the signal from the audio device. Such devices include, but are not limited to amplifiers and power modulators. The invention further embodies the use of any device capable of modulating the nature, amplitude, frequency or clarity of the signal produced from the audio device. Such devices include, but are not limited to A/D converters, D/A converters, equalizers and DOLBY® or similar sound manipulation systems. A wireless communication link such as the BLUETOOTH® system is also within the scope of the present invention. One preferred embodiment is described in FIGS. 1–3. One or several submersible and pressure resistant cables 25 from the female stereo jack runs up to an exterior volume control 26 comprised of a variable resistor. The audio cable is made of material capable of transmitting audio data. This material can range from copper to fiber optics. This cable is covered with a non-permeable flexible membrane. Between the housing coupling unit and the speakers, in the cable, is positioned a variable resistor 26 in the cable for adjusting the volume of the earphones. The resistor circuitry will allow for modulation of the audio level to the speakers. Furthermore, the circuitry is within a permanently sealed housing that can withstand one, or more, absolute pressures.

In some embodiments, the device of the present invention comprises components for connecting the audio device to any of several devices capable of producing sound. Such devices include, for instance, loudspeaker elements, electrostatic transducers, bone conducting devices, and ultrasound-generating devices. The invention embodies the use of any type of loudspeaker element capable of producing audible sound, including but not limited to magnetic elements, piezoelectric elements and electrostatic transducers.

In some embodiments, the device of the present invention comprises an underwater headset comprising at least one speaker within a waterproof enclosure, wherein said speaker is adapted for vertical and horizontal positioning. The headset may be attached to the user's head, or to the user's equipment such as face mask, mask strap or hood or to any other desired location. In a preferred embodiment, the speaker is mounted on a member capable of horizontal and vertical movement. The member may be comprised of a rigid or flexible material such as plastic, rubber or metal. Any type of device capable of producing sound, including loudspeaker elements, electrostatic transducers, bone conducting devices, and ultrasound-generating devices, may be used. Any type of loudspeaker element capable of producing audible sound, including but not limited to magnetic elements, piezoelectric elements and electrostatic transducers may be used. In one preferred embodiment, at least one speaker is capable of operating with a frequency between 290 Hz and 10 kHz. In another preferred embodiment the headset is provided with multiple speaker elements covering a wide frequency range. In a most preferred embodiment, the output from the midrange speaker of a multiple-speaker construction, or the midrange register of a single-speaker construction, is amplified. The terms "midrange" and "midrange register" are used herein as defined by the usage of one skilled in the art. In some embodiments, a waterproof enclosure surrounds the speakers. Such enclosure may be made from any rigid or flexible waterproof material, including plastic, rubber or metal. In a preferred embodiment the enclosure is capable of withstanding pressures encountered by a diver, such as a scuba diver. In another preferred embodiment, the waterproof enclosure comprises a water-resistant membrane or diaphragm capable of transmitting audible sound. Such membrane may be made from, for instance, fiber-reinforced epoxy, polyester or ABS resin. In some embodiments, the device of the present invention comprises various control devices including, but not limited to, an on/off switch, a volume control or an amplifier.

In some embodiments, the device of the present invention comprises a wireless receiver system attached to the user's headset. Any wireless receiver connected to any analog converter capable of sending an audio signal to the speakers may be used. The invention further embodies the use of additional control devices including, but not limited to, an on/off switch, a volume control and an amplifier.

Figure 4:
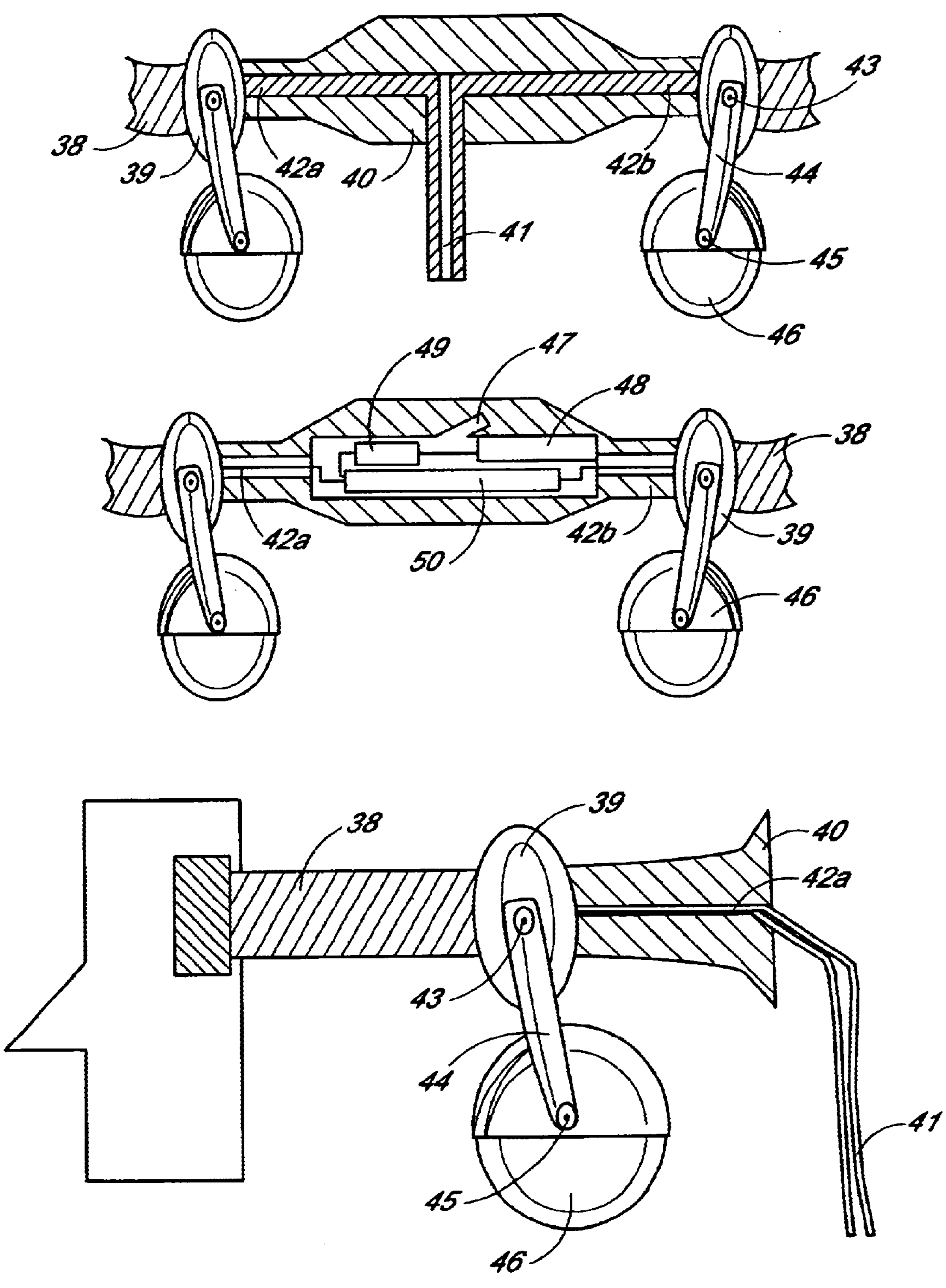
FIG. 4. Plan and side view of the head mounted speaker system assembly, wherein the side view includes a scuba mask and strap.
Figure 5:
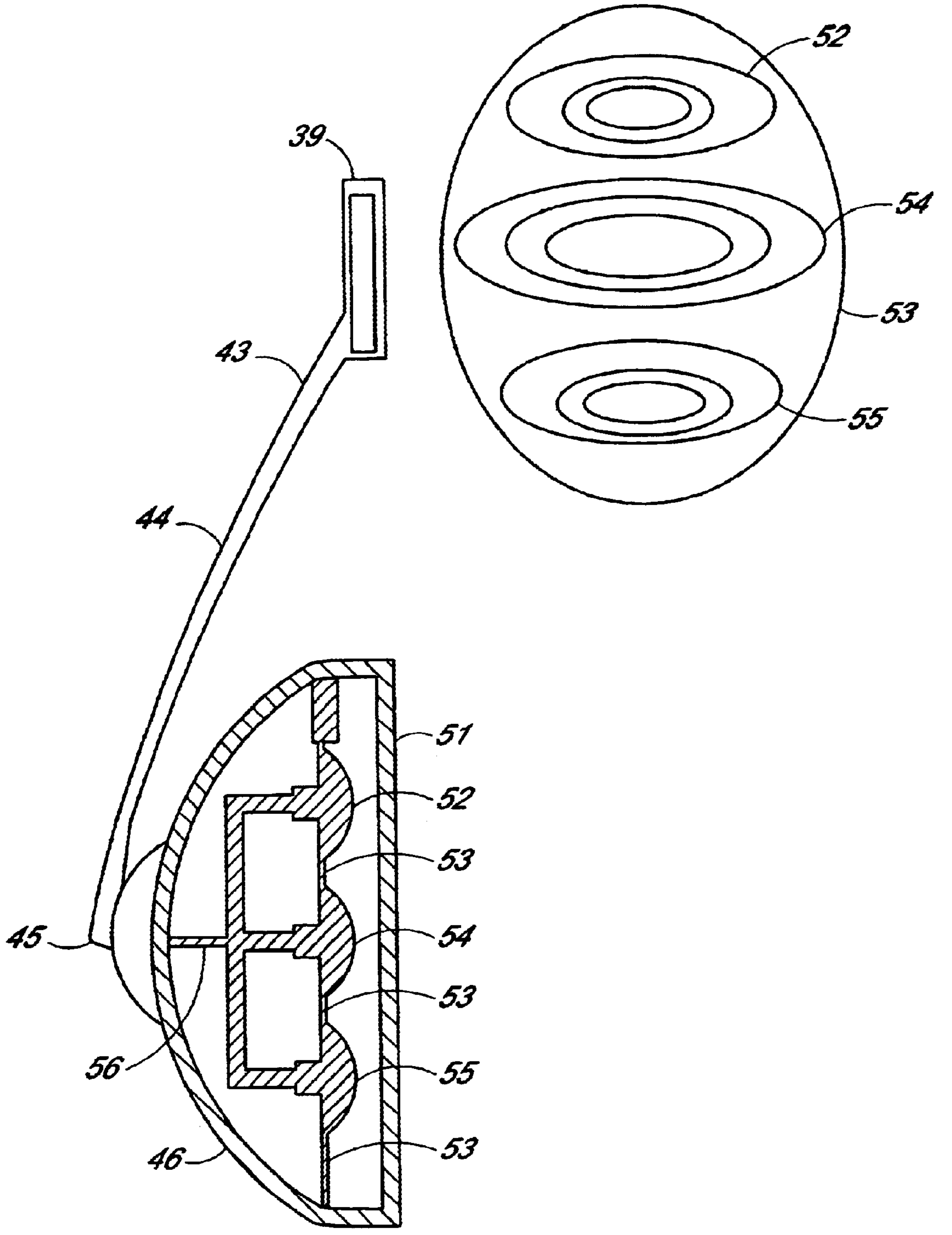
FIG. 5. A cross-section and front view of the speaker system assembly.

Preferred embodiments are disclosed in FIGS. 4 to 5. The headset utilizes a frame 39 to which the speaker arm 44 is mounted. The frame 39 is rigid and comprises a swivel 43 and a hollow chamber through which a mask strap 38 feeds. This will allow for horizontal adjustment by sliding, and for vertical adjustment by rotating the arm 44 about the swivel 43. Thus, a user can position the speaker housing 46 to personal and custom coordinates. The speaker arm 44 is a concave frame with speaker housing 46 mounted on the end 45 of arm 44. Angular adjustments allow the user to specifically orient the speaker housing 46 in three-dimensional space to suit personal coordinates. It is intended for the user to position the speakers 52, 54, 55 of the speaker housing 46 (see FIG. 5) near the ears, directing the sound waves into the ear canal but not restricting the canal passageways. This is important to allow the diver the ability to equalize pressure of the sinus and ear canals with the ambient pressure of the environment.

Figure 10:
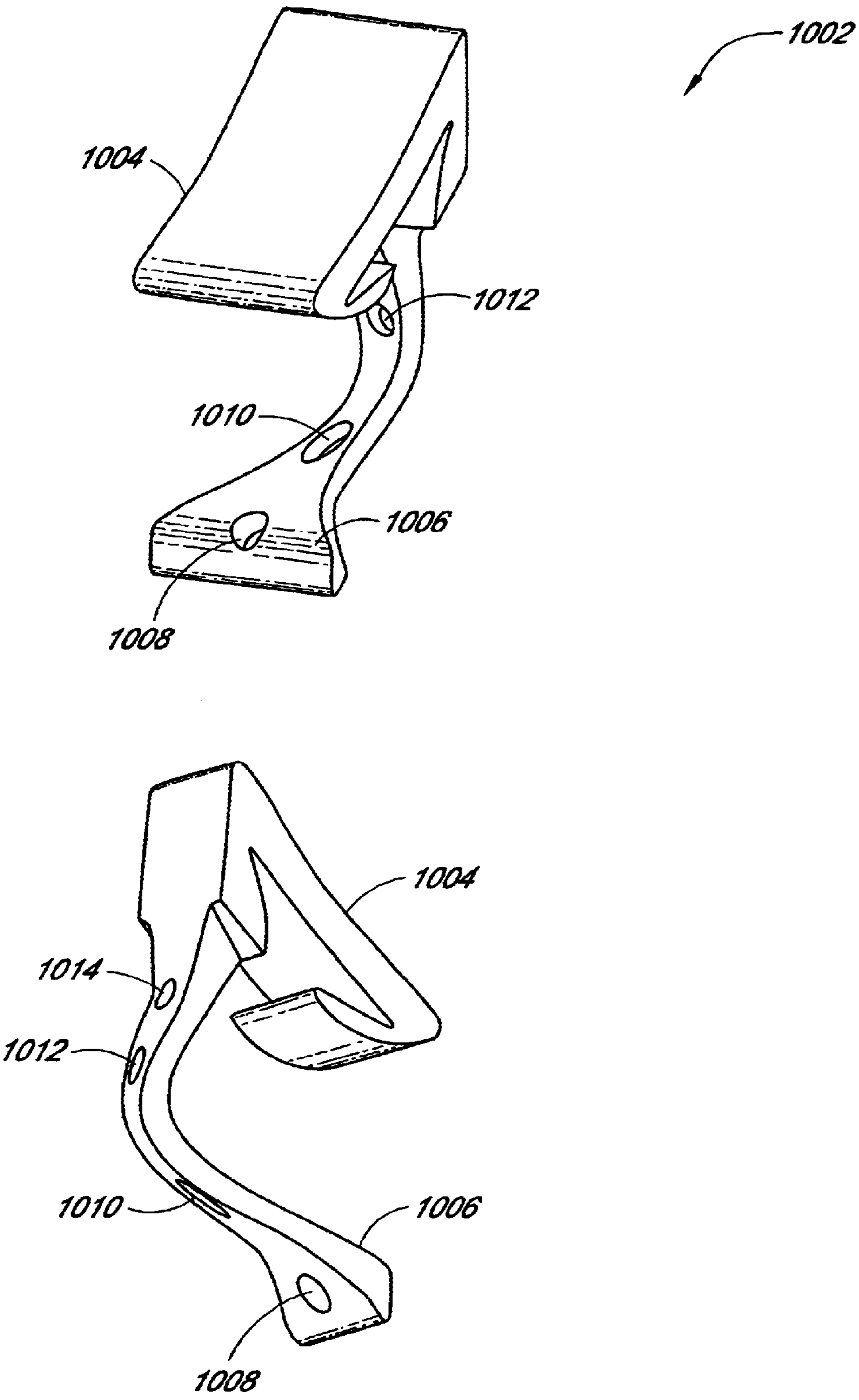
FIG. 10.

FIG. 10 shows two views of a frame 1002 which may be utilized with the speaker system assembly of FIG. 5. In this embodiment, the frame 1002 consists of a portion 1004 for attaching the frame 1002 to the mask strap of a diver. The frame 1002 further consists of a portion 1006 to which the speaker housing may be affixed using, for example, a screw-hole 1008. The frame 1002 may be further provided with through holes 1010, 1012, and 1014 for threading through a physical communication link between the speaker housing and the audio device housing shown in FIG. 1. Frame 1002 may be made from a rubber material to provide both firmness and elasticity, as well as a soft feel. Alternatively, frame 1002 may be made of suitable plastic or aluminum materials.

The wire cable runs through the membrane of the securely sealed speaker housing 46 to the piezoelectric 52, 54, and 55 ceramic speaker elements with a 290 Hz to 10 kHz frequency range. This range is important in the design of the speakers 52, 54, and 55 because they work to correct for aquatic dampening effect. The three speakers 52, 54, and 55 are designed to operate at fidelity levels heard out of water, while underwater. Due to the dampening effect of water, the frequency ranges for the dampened wavelengths are compensated. Thus, out of water, the speakers 52, 54, and 55 do not sound normal. However being underwater, they provide fidelity without loss of clarity. A rigid yet nondense diaphragm 51 comprising of such materials as fiber-reinforced epoxy, polyester, ABS resin or the like, covers the speakers 52, 54, and 55. This will allow the sound to travel through the diaphragm 51 with the least resistance and serve to move the diaphragm 51 for increased sound fidelity. It is a permanent structure and should be sealed and fixed.

In another embodiment shown in FIG. 4, a wireless receiver system is equipped into the mask strap system. A wireless receiver 49 is connected to an analog converter 50, which then send the audio signal to the speakers via cables 42*a,* 42*b*. A switch 47 allows the user to control the power. The switch is covered with a flexible nonpermable membrane that can toggle to an on or off position. A battery 48 provides the power to wireless receiver system. The battery is secured from the environment within the receiver system and can be easily replaced by unscrewing a side port lid and sliding the battery out for replacement. The interior circuitry 56 of the speakers 52, 54, 55 is coated with a nonconductive, marine grade material to prevent corrosion and damage. By using, piezoelectric, bone conduction, or ultrasonic mechanisms, high fidelity is accessible. The purpose of having several speakers is to be able to compensate for the fidelity loss caused by the water. In the embodiment represented in FIG. 5 the mid-range frequency speaker provides greater signal amplification than the low range 55 and high range 52 speakers. Thus, in effect, the audio fidelity heard underwater is maintained by over amplification of dampened frequency ranges. For those seeking to use a system that maintains the highest audio fidelity while underwater, this device provides enhancements over other systems.

Figure 11A:
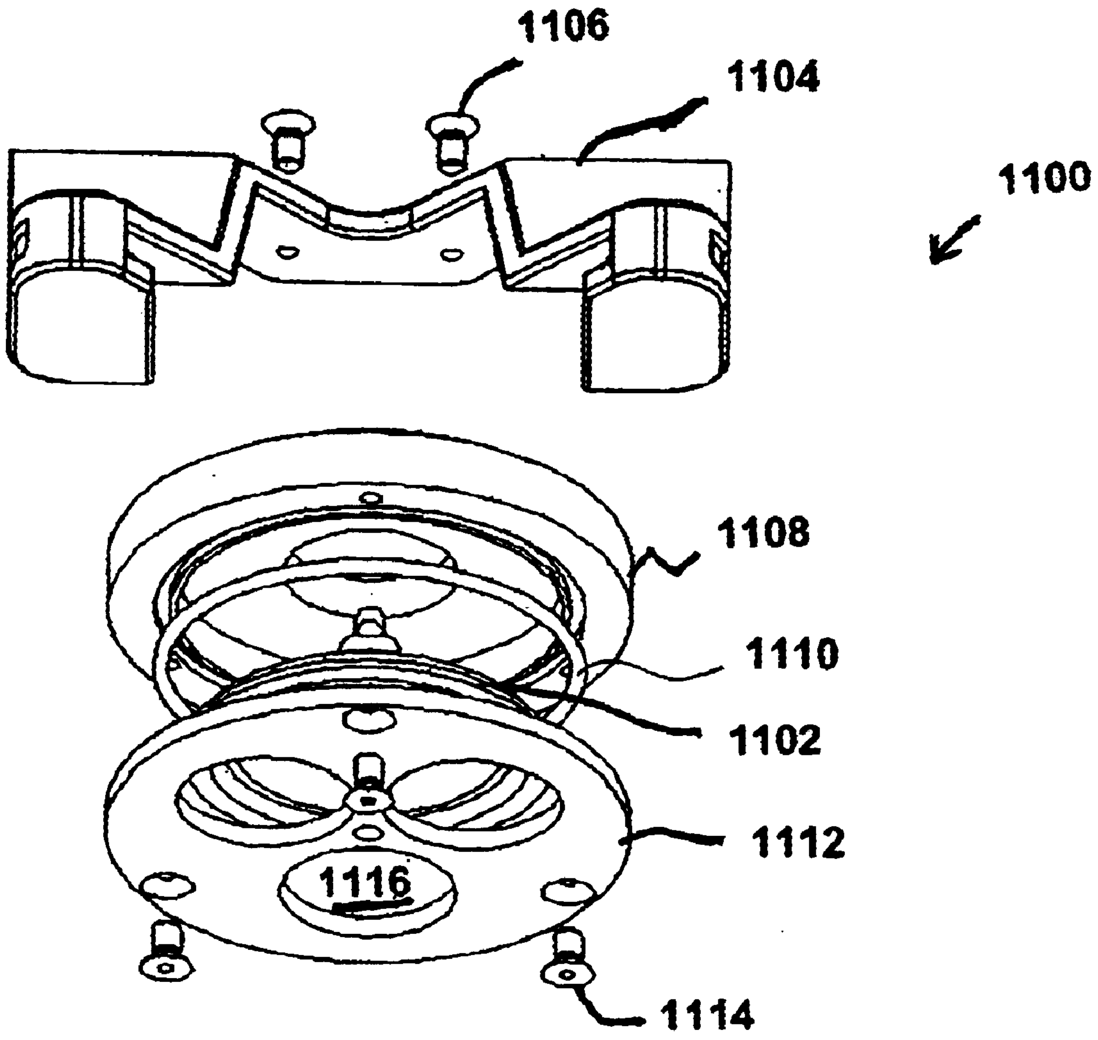
FIG. 11A is an exploded three dimensional view of a speaker system assembly.
Figure 11B:
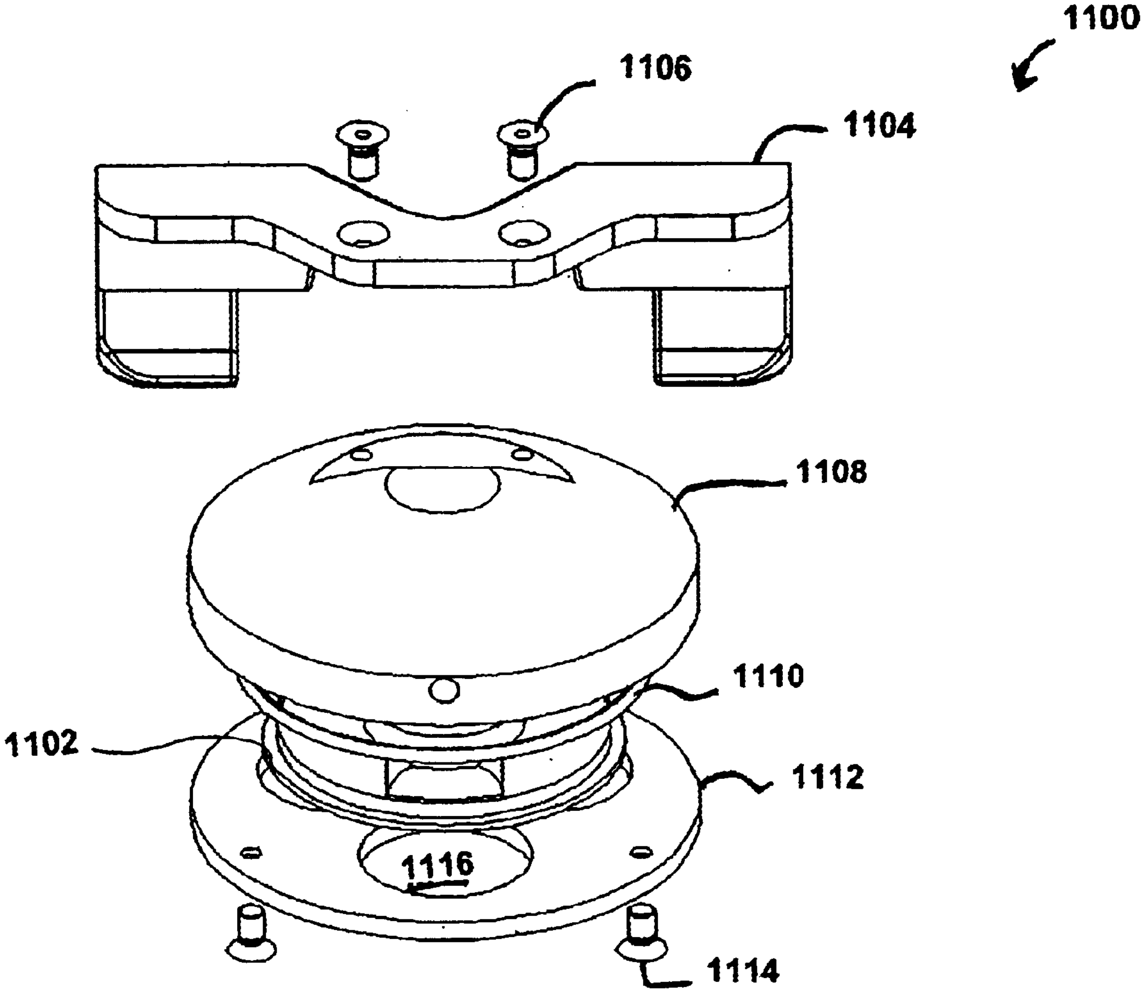
FIG. 11B is a three dimensional view of the speaker system assembly of FIG. 11A.
Figure 11C:
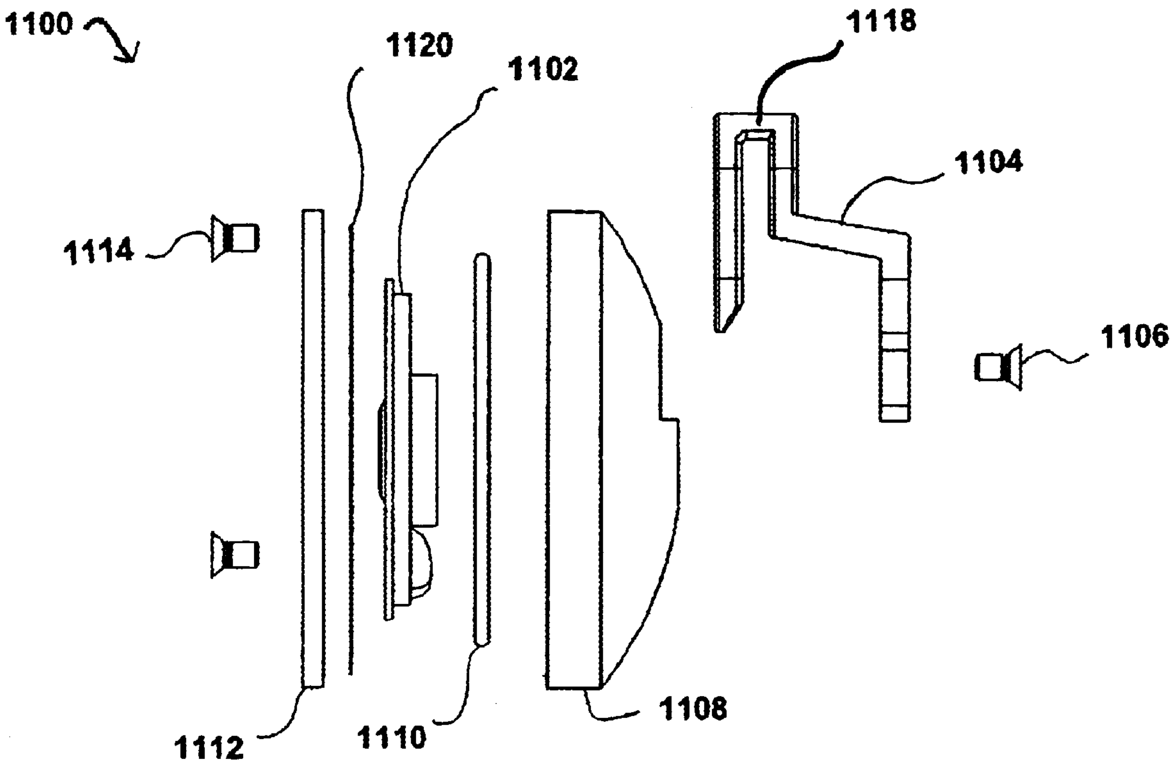
FIG. 11C is an exploded side view of the speaker system assembly of FIG. 11A.

FIG. 11A shows an exemplary embodiment of a housing 1100 for a speaker 1102 that may be used with the personal audio system disclosed herein. The speaker housing 1100 may consist of a mask clip 1104 for securing the speaker and its housing to the mask strap of a diver's mask. The mask clip 1104 includes screws 1106 for fastening the speaker housing assembly to the mask clip 1104. The mask clip 1104 may be made of a material such as rubber or light-weight aluminum. The mask clip 1104 is designed to securely engage to a diver's mask strap. For example, with reference to FIG. 11C, the mask clip 1104 has a portion 1118 shaped like an inverted "u" in order to engage the diver's face mask. The speaker housing 1100 further includes a housing base 1108 for setting the speaker 1102 therein. The housing base 1108 includes a concave portion for receiving the speaker 1102. The housing base 1108 may be made of a plastic, metallic, or rubber material. The housing 1100 may also include a o-rings 1110 and 1120 to ensure that the housing 1100 remains waterproof, thereby protecting the speaker 1102. A person of ordinary skill in the art will recognize that many commercially available o-rings will serve the desired function. The housing 1100 may also include a housing lid 1112 to engage the housing base 1108. The housing lid 1112 has at least one aperture to permit sound transmission from the speaker 1102 to the ear of a diver. FIG. 11A shows a speaker housing lid 1112 having three apertures 1116. The housing lid 1112 may be made of the same materials as the housing base 1108. Furthermore, the housing lid 1112 may be secured to the speaker housing base 1108 by, for example, a group of screws 1114. It will be apparent to a person of ordinary skill in the art that the exemplary embodiment for the speaker housing assembly 1100 discussed here may be implemented in a variety of ways. What is relevant is to provide a speaker assembly system that includes a means for attaching the speaker housing to the diver's mask (e.g., the mask clip 1104) as well as a waterproof housing means (e.g., housing base 1108, o-ring 1110, and housing lid 1112) to protect the speaker 1102. FIGS. 11B and 11C respectively show a perspective view and a side view of the housing assembly 1100.

In yet another embodiment of the invention, an underwater headset comprising at least one speaker within a waterproof enclosure, wherein said at least one speaker is mounted on a frame that attaches to the ear, is provided. One skilled in the art is aware of multiple means for attaching a device to the ear, including, but not limited to, a component wrapping around the ear, a component clipping to the ear or a component being inserted into the ear. The invention embodies the positioning of speakers outside of the ear, or inserted into the ear canal. Any rigid or flexible materials may be used in the manufacture of the enclosure. In one preferred embodiment, said enclosure is capable of withstanding pressure encountered while diving, for example, scuba diving. In another preferred embodiment, the waterproof enclosure is made from a flexible material, such as rubber, plastic, or silicone. In a most preferred embodiment, the flexible material is capable of forming the shape of the user's ear canal.

Figure 12A:
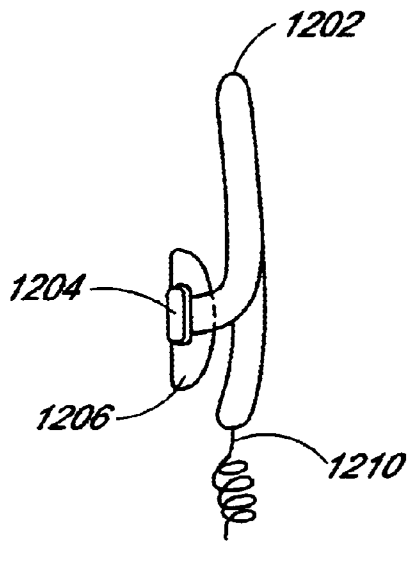
FIG. 12A illustrates a speaker system assembly adapted to clip on the ear of the user.
Figure 12B:
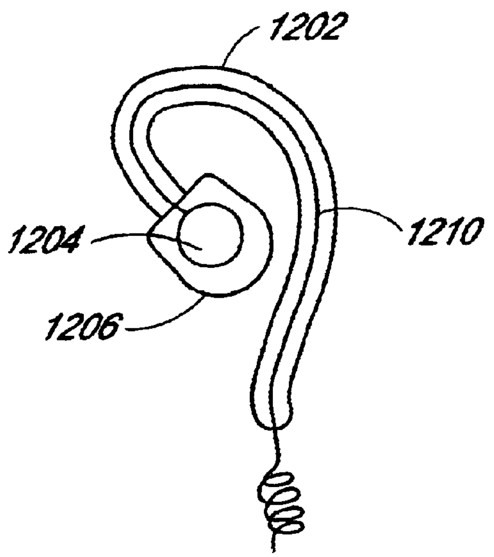
FIG. 12B is a side view of the speaker assembly system of FIG. 12A.
Figure 12C:
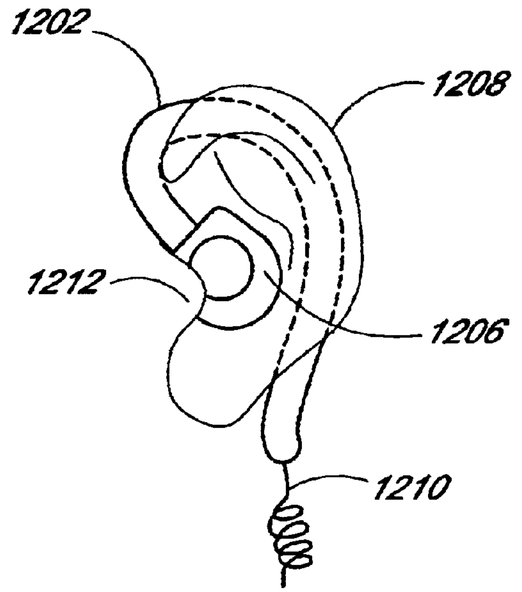
FIG. 12C illustrates the speaker assembly system of FIG. 12A positioned on the ear of a user.

FIGS. 12A–12C show an embodiment implementing a speaker system assembly having an ear clip 1202 attached to a speaker housing 1204 and integrating a moldable piece 1206 that conforms to the shape of the outer ear 1212 of a diver. The ear clip 1202 is designed to wrap around the ear lobe 1208 of a diver for supporting the speaker assembly 1204 securely yet comfortably. The ear clip 1202 may be made of a soft-molded rubber, and it may be manufactured such that it accommodates a physical communication link 1210 connecting the speaker system assembly 1204 and the housing shown in FIG. 1. The moldable piece 1206 may be made of a soft gel which molds to the shape of the outer ear 1212 of a diver. The moldable piece 1206 may be one such as that manufactured by JABRA Corporation under the trade name JABRA EarGels®. The JABRA EarGels® allows the audio signal to reach the diver's inner ear while at the same time protecting the speaker system 1204 from the elements, such as a water environment.

Additional control devices including, but not limited to, an on/off switch, a volume control or an amplifier may be included. The invention further embodies the use of any type of device capable of generating sound, including, but not limited to, piezoelectric, magnetic, electrostatic transducers, bone conducting and ultrasound.

This invention provides a simple and effective means of containing and submersing an entertainment device to one or more pressures absolute, while maintaining a hydrostatic seal against the environment. The result is a submersible device that can produce audio waves underwater from a portable audio device. This disclosure has described how it overcomes deficiencies in prior art. An even further advancement can include integrating the disclosed invention with a dive computer. Thus, a housing can be explained that contains the components of a dive computer and the necessary components to interpret and send, via wireless or analog transmission, audio data all within a single portable unit.

Embodiments of the present invention have been shown and described with a degree of particularity to enable their complete and full understanding. It should be understood, however, that the present invention embodies the inventive concepts as defined by the claims, and is not limited by any detailed description herein.

What is claimed is:

1. A housing for receiving an audio device for use by a SCUBA diver, the housing comprising:

a rigid container and a rigid lid adapted to fit the container, wherein the container is adapted to receive the audio device, and wherein a seal between the container and the lid is configured to be waterproof in a SCUBA environment, and wherein the container comprises a lighting device for making the audio device visible;

components which secure the lid to the container; and components which externally control the device.

2. The system of claim 1, wherein said lid has a first level designed to sit on the outer perimeter of the opening of the container, and wherein said lid has a second level designed to sit within a step in the container.

3. The system of claim 1, wherein said seal is capable of withstanding underwater pressures encountered by a SCUBA diver.

4. The system of claim 1, further comprising:

components which connect the device to an audio jack, wherein the audio jack is attached to the housing; and components which connect an audio communication link to the audio jack.

5. The system of claim 4, wherein the components which connect an audio communication link to the audio jack comprise:

a male hydraulic nipple;

a female hydraulic coupling; and a locking bearing mechanism to establish a hydrostatic audio connection between the male hydraulic nipple and the female hydraulic coupler.

6. The system of claim 4, wherein said audio communication link is capable of transmitting an analog signal.

7. The system of claim 4, wherein said audio communication link is capable of transmitting a digital signal.

8. The system of claim 4, wherein said audio communication link is wireless.

9. The system of claim 1, wherein said audio device is selected from the group consisting of: audio player, MP3 player, CD player, cassette player, DVD player, communication device, telephone, cellular telephone, radio receiver, radio transmitter, computer, laptop computer, palm pilot, personal digital assistant, pager, measuring device, geiger counter, sonar, pH meter, thermometer, luminometer, and magnetometer.

10. The system of claim 1, wherein said audio device recites recorded information on locations and objects encountered during underwater activity in a specific location.

11. The system of claim 1, wherein said container comprises a moisture sensor.

12. The system of claim 1, wherein said lighting device is internal to the housing.

13. The system of claim 1, further comprising components for monitoring the operation of the audio device.

14. The system of claim 1, wherein the lighting device comprises an electrical source of light.

15. The system of claim 1, wherein the lighting device comprises a chemical source of light.

16. The system of claim 1, wherein the lighting device comprises a biological source of light.

17. The system of claim 1, wherein the components which externally control the device comprise a manual control mechanism capable of horizontal and vertical movement and an internal device capable of horizontal and vertical movement.

18. The system of claim 1, wherein the components which connect an audio communication link to the audio jack are internally sealed.

19. The system of claim 1, wherein the outside of said container is adapted to facilitate attachment to the user.

20. The system of claim 1, wherein the components which secure the lid to the container operate so as to lock the lid to the container.

21. The system of claim 20, wherein said locking components comprise safety features preventing accidental opening.

22. The system of claim 1, further comprising an external volume control.

23. The system of claim 22, wherein said external volume control comprises an amplifier.

24. The system of claim 5, further comprising a device generating audible sound connected to the communication link.

25. The system of claim 24, wherein said sound-generating device comprises earphones, and wherein the operative components of the earphone are contained within a sealed enclosure.

26. An underwater audio headset comprising:

at least two speakers within a waterproof enclosure, said waterproof enclosure mounted on a frame that is adapted for vertical and horizontal positioning;

wherein at least one of the two speakers is configured to compensate for a dampening of sound frequencies underwater.

27. The headset of claim 26, wherein said enclosure comprises an audio-permeable and water-resistant membrane.

28. The headset of claim 26, further comprising an on/off switch.

29. The headset of claim 26, further comprising a volume control.

30. An underwater audio headset comprising:

at least one speaker within a waterproof enclosure:

a mask clip configured for removable attachment to the waterproof enclosure, and wherein the mask clip is further configured for removable attachment to a face mask of a SCUBA diver; and wherein the mask clip comprises at least one arm that removably attaches to the face mask.

31. The headset of claim 30 wherein the at least one speaker is configured to compensate for a dampening of sound frequencies underwater.

32. The headset of claim 30, further comprising an on/off switch.

33. The headset of claim 30, further comprising a volume control.

34. A housing for receiving an audio device for use by SCUBA divers, the housing comprising:

a rigid container adapted to receive the audio device;

a rigid lid adapted to fit the container;

a seal between the container and the lid that is configured to be waterproof in a SCUBA environment;

a valve attached to the housing; and components which externally control the device.

35. The system of claim 34, wherein the valve comprises a pressure release valve.

36. The system of claim 34, wherein the valve comprises a vacuum release valve.

37. The system of claim 34, wherein the valve comprises a one-way valve configured to allow water to exit a chamber of the housing.

38. The system of claim 34, further comprising:

components which connect the device to an audio jack, wherein the audio jack is attached to the housing; and components which connect an audio communication link to the audio jack.

39. The system of claim 38, wherein the components which connect the audio communication link to the audio jack comprise:

a male hydraulic nipple;

a female hydraulic coupling; and a locking bearing mechanism to establish a hydrostatic audio connection between the male hydraulic nipple and the female hydraulic coupler.

40. The system of claim 38, wherein said audio communication link is capable of transmitting an analog signal.

41. The system of claim 38, wherein said audio communication link is capable of transmitting a digital signal.

42. The system of claim 38, wherein said audio communication link is wireless.

43. The system of claim 34, wherein said audio device is selected from the group consisting of: audio player, MP3 player, CD player, cassette player, DVD player, telephone, cellular telephone, radio receiver, radio transmitter, computer, laptop computer, palm pilot, personal digital assistant, pager, geiger counter.

44. A housing for receiving an audio system for use by SCUBA divers, the housing comprising:

a rigid container adapted to receive the audio device;

a rigid lid adapted to fit the container;

a seal between the container and the lid configured to be waterproof in a SCUBA environment;

at least one component within the housing which substantially prevents water from reaching the audio device; and at least one component which externally controls the device.

45. The system of claim 44, wherein said at least one component which substantially prevents water from reaching the audio device comprises a water-absorbing material.

46. The system of claim 44, wherein said at least one component which substantially prevents water from reaching the audio device comprises at least one chamber in the housing for receiving water from the container, wherein the chamber and the container are in fluid communication via a one-way valve.

47. The headset of claim 26, further comprising a third speaker, wherein a first speaker is a low range speaker, a second speaker is a mid-range speaker, and a third speaker is a high range speaker.

48. The headset of claim 26, wherein at least one speaker is configured to compensate for the dampening of sound frequencies underwater by overamplification of its output sound frequencies.

49. The headset of claim 30, wherein the mask clip comprises at least two distinct arms that removably attach to the face mask.

50. The headset of claim 30, wherein the mask clip comprises at least two distinct arms, and wherein at least one of the two arms is substantially u-shaped.

* * * * *